(12) United States Patent
Nagao

(10) Patent No.: US 9,275,039 B2
(45) Date of Patent: Mar. 1, 2016

(54) INFORMATION PROCESSING DEVICE, INFORMATION PROCESSING METHOD AND COMPUTER PROGRAM PRODUCT

(75) Inventor: Manabu Nagao, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 584 days.

(21) Appl. No.: 13/617,309

(22) Filed: Sep. 14, 2012

(65) Prior Publication Data

US 2013/0073564 A1 Mar. 21, 2013

Related U.S. Application Data

(63) Continuation of application No. PCT/JP2011/055682, filed on Mar. 10, 2011.

(30) Foreign Application Priority Data

Mar. 19, 2010 (JP) ................................. 2010-064981

(51) Int. Cl.
*G10L 15/193* (2013.01)
*G06F 17/27* (2006.01)

(52) U.S. Cl.
CPC .......... *G06F 17/2775* (2013.01); *G10L 15/193* (2013.01)

(58) Field of Classification Search
CPC .................... G06F 17/2775; G10L 15/193
USPC .............................................. 704/9, 231–258
See application file for complete search history.

(56) References Cited

U.S. PATENT DOCUMENTS

| | | | | |
|---|---|---|---|---|
| 5,806,032 | A * | 9/1998 | Sproat ........................... | 704/255 |
| 6,032,111 | A * | 2/2000 | Mohri ............................... | 704/9 |
| 7,027,988 | B1 * | 4/2006 | Mohri ........................... | 704/257 |
| 7,383,185 | B1 | 6/2008 | Mohri | |
| 7,634,408 | B1 * | 12/2009 | Mohri ........................... | 704/251 |
| 2002/0120437 | A1 * | 8/2002 | Kempe ............................... | 704/9 |
| 2004/0162826 | A1 * | 8/2004 | Wyschogrod et al. ............. | 707/6 |
| 2007/0005657 | A1 * | 1/2007 | Bohannon et al. ............ | 707/200 |
| 2008/0071802 | A1 * | 3/2008 | Lucco et al. .................. | 707/100 |
| 2010/0138367 | A1 * | 6/2010 | Yamagaki ........................ | 706/12 |
| 2011/0071974 | A1 * | 3/2011 | Iwamasa .......................... | 706/47 |
| 2013/0073564 | A1 * | 3/2013 | Nagao ........................... | 707/748 |

FOREIGN PATENT DOCUMENTS

| | | |
|---|---|---|
| JP | 2009-237913 | 10/2009 |
| WO | WO 2009/119415 | 10/2009 |

OTHER PUBLICATIONS

J. Hoperoft, Automaton Gengo Riron Keisanron I, $2^{nd}$ edition, Saienshu-sha Co., Ltd., Apr. 10, 2003, pp. 86-88.
International Search Report for PCT/JP2011/055682, mailed Apr. 26, 2011.
J. Hopcroft, Automaton Gengo Riron Keisanron I, $2^{nd}$ edition, Saienshu-sha Co., Ltd., Apr. 10, 2003, pp. 86-88.
G. van Noord, "Treatment of Epsilon Moves in Subset Construction", *Computational Linguistics*, vol. 26, No. 1, pp. 61-76.
M. Mohri et al., "The Design Principles of a Weighted Finite-State Transducer Library", *Preprint submitted to Elsevier Preprint*, May 3, 1999, 19 pgs.
M. Mohri, "Generic £-Removal Algorithm for Weighted Automata", *Implementation and Application of Automata*, $5^{th}$ International Conference, CIAA2000, Revised Papers, LNCS2088, 2001, pp. 230-242.
M. Mohri, "Generic £-Removal and Input £-Normatlization Algorithms for Weighted Tranducers", *International Journal of Foundations of Computer Science*, vol. 13, No. 1, 2002, pp. 129-143.

* cited by examiner

*Primary Examiner* — Samuel G Neway
(74) *Attorney, Agent, or Firm* — Nixon & Vanderhye, P.C.

(57) ABSTRACT

According to an embodiment, an information processing device includes a first set generating unit that generates a first set of states reachable by following ε-transitions in a forward direction and a reverse direction among states included in a finite state automaton; a second set generating unit that generates a second set representing a set of states included in each of a plurality of first sets connected by one transition that is not an ε-transition and the first set that is not connected to another first set by one transition that is not an ε-transition; a combination generating unit that obtains, among combinations of ε-removal patterns to be respectively applied to the ε-transitions in the second set, a combination with which the number of transitions after removing ε-transitions is the smallest; and a removing unit that removes ε-transitions in the second set by the removal patterns included in the obtained combination.

13 Claims, 23 Drawing Sheets

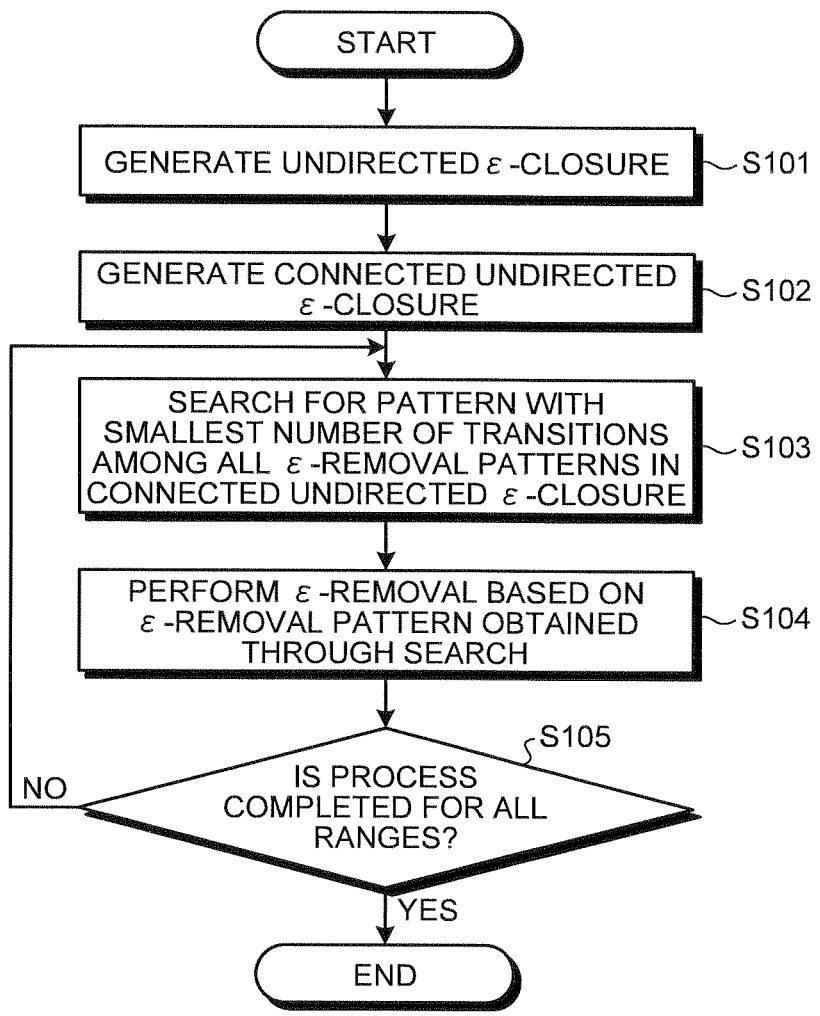

FIG.3 all - undirected - ε - closure

1.   $Q_r \leftarrow Q$, $\Theta \leftarrow \phi$, $S \leftarrow \phi$
2.   while $Q_r \neq \phi$
3.       $Q_\varepsilon \leftarrow \phi$
4.       q ← get one element from $Q_r$
5.       push(S, q)
6.       while $S \neq \phi$
7.           $q_\varepsilon \leftarrow pop(S)$
8.           $Q_\varepsilon \leftarrow Q_\varepsilon \cup \{q_\varepsilon\}$
9.           foreach $e \in E$ such that input $(e) = \varepsilon$
10.             if $p(e) = q_\varepsilon \wedge n(e) \notin Q_\varepsilon$
11.                 push(S, n(e))
12.             else if $n(e) = q_\varepsilon \wedge p(e) \notin Q_\varepsilon$
13.                 push(S, p(e))
14.       $Q_r \leftarrow Q_r \setminus Q_\varepsilon$
15.       if $|Q_\varepsilon| \geq 2$
16.           $\Theta \leftarrow \Theta \cup \{Q_\varepsilon\}$
17.   return $\Theta$

FIG.4

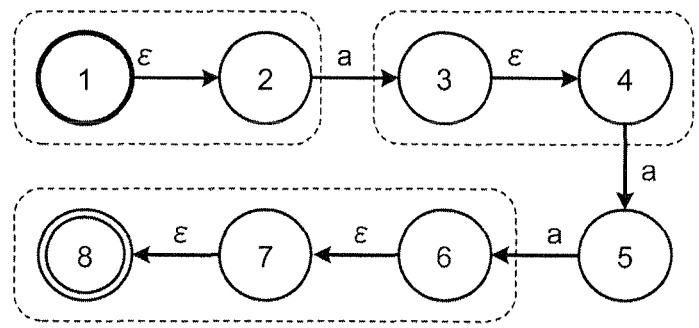

```
all-CUEC(Θ)
1   Ψ ← φ
2   foreach θ ∈ Θ
3       ψ ← {θ}
4       foreach q ∈ θ
5           foreach θ' ∈ Θ such that θ ≠ θ'
6               foreach q' ∈ θ'
7                   if there is e ∈ E such that ((p(e) = q ∧ n(e) = q') ∨ (n(e) = q ∧ p(e) = q')) ∧ input(e) ≠ ε
8                       ψ ← ψ ∪ {θ'}
9       foreach ψ' ∈ Ψ
10          if ψ ∩ ψ' ≠ φ
11              ψ ← ψ ∪ ψ'
12              Ψ ← Ψ \ {ψ'}
13      Ψ ← Ψ ∪ {ψ}
14  return Ψ
```

ε-REMOVAL PATTERN 0

FIG. 9

ε-REMOVAL PATTERN 1

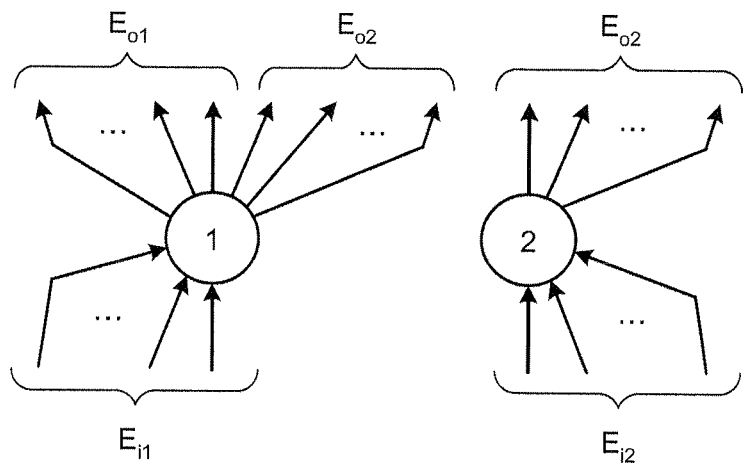

FIG. 10 all-ε-pair($\psi$)

1    $P_\varepsilon \leftarrow \phi$,   $S \leftarrow \phi$
2    foreach $\theta \in \psi$
3       foreach $q \in \theta$
4          push$(S, q)$,   $Q_S \leftarrow \phi$
5          while $S \neq \phi$
6             $q_S \leftarrow$ pop$(S)$
7             $Q_S \leftarrow Q_S \cup \{q_S\}$
8             foreach $e \in \varepsilon$-out$(q_S)$ such that $n(e) \notin Q_S$
9                 $P_\varepsilon \leftarrow P_\varepsilon \cup \{(q, n(e))\}$
10            push$(S, n(e))$
11   return $P_\varepsilon$

FIG.11

$f_{num}(x, P_\varepsilon)$

1   $E_{ne} \leftarrow \phi$, $Q_\varepsilon \leftarrow \{q_s, q_d \mid (q_s, q_d) \in P_\varepsilon\}$
2   foreach $q \in Q_\varepsilon$
3      $(E_{in}, E_{out}, b_{initial}, b_{final}, b_{error}) \leftarrow$ make-transition $(q, x, P_\varepsilon)$
4      if $b_{error} =$ true
5         return $\infty$
6      if $(E_{in} \neq \phi \land E_{out} \neq \phi) \lor (b_{initial} =$ true $\land E_{out} \neq \phi) \lor (b_{final} =$ true $\land E_{in} \neq \phi)$
7         $E_{ne} \leftarrow E_{ne} \cup E_{in} \cup E_{out}$
8   return $|E_{ne}|$

FIG.12 make-transition $(q, x, P_\varepsilon)$

1   $b_{initial} \leftarrow q \in I$, $b_{final} \leftarrow q \in F$
2   $E_{in} \leftarrow \{e \mid e \in in(q) \land input(e) \neq \varepsilon\}$, $E_{out} \leftarrow \{e \mid e \in out(q) \land input(e) \neq \varepsilon\}$
3   for $i$ from 1 to $|P_\varepsilon|$
4      $(q_s, q_d) \leftarrow p_i$
5      if $q_s = q$
6         if $x_i = 1$
7            $E_{out} \leftarrow E_{out} \cup \{(q, input(e), n(e)) \mid e \in out(q_d) \land input(e) \neq \varepsilon\}$
8            if $q_d \in F$
9                $b_{final} \leftarrow$ true
10     if $q_d = q$
11        if $x_i = 0$
12           if $q_s \in F$
13              return $(\phi, \phi,$ false, false, true$)$
14           $E_{in} \leftarrow E_{in} \cup \{(p(e), input(e), q) \mid e \in in(q_s) \land input(e) \neq \varepsilon\}$
15        if $q_s \in I$
16           $b_{initial} \leftarrow$ true
17  return $(E_{in}, E_{out}, b_{initial}, b_{final},$ false$)$

FIG. 13

CUEC - ε - removal$(x, P_\varepsilon)$

1  $Q_\varepsilon \leftarrow \{q_s, q_d | (q_s, q_d) \in P_\varepsilon\}, Q_{new} \leftarrow Q, E_{new} \leftarrow E, I_{new} \leftarrow I, F_{new} \leftarrow F$
2  foreach $q \in Q_\varepsilon$
3  $\quad (E_{in}, E_{out}, b_{initial}, b_{final},) \leftarrow$ make - transition $(q, x, P_\varepsilon)$
4  $\quad$ if $(E_{in} \neq \phi \wedge E_{out} \neq \phi) \vee (b_{initial} = \text{true} \wedge E_{out} \neq \phi) \vee (b_{final} = \text{true} \wedge E_{in} \neq \phi) \vee (b_{initial} = \text{true} \wedge b_{final} = \text{true})$
5  $\quad\quad E_{new} \leftarrow E_{new} \cup E_{in} \cup E_{out}$
6  $\quad$ else
7  $\quad\quad E_{new} \leftarrow E_{new} \setminus (E_{in} \cup E_{out}), Q_{new} \leftarrow Q_{new} \setminus \{q\}, I_{new} \leftarrow I_{new} \setminus \{q\}, F_{new} \leftarrow F_{new} \setminus \{q\}$
8  $\quad$ if $b_{initial} = \text{true}$
9  $\quad\quad I_{new} \leftarrow I_{new} \cup \{q\}$
10 $\quad$ if $b_{final} = \text{true}$
11 $\quad\quad F_{new} \leftarrow F_{new} \cup \{q\}$
12 $\quad E_{new} \leftarrow E_{new} \setminus \varepsilon$ - out $(q)$
13 $Q \leftarrow Q_{new}, E \leftarrow \{e \in E_{new} | P(e) \in Q_{new} \wedge n(e) \in Q_{new}\}, I \leftarrow I_{new}, F \leftarrow F_{new}$

FIG. 14

DI - ε - removal

1  $\Theta \leftarrow$ all - undirected - ε - closure$(\ )$
2  $\Psi \leftarrow$ all - CUEC$(\Theta)$
3  foreach $\psi \in \Psi$
4  $\quad P_\varepsilon \leftarrow$ all - ε - pair$(\psi)$
5  $\quad x \leftarrow \arg\min_{x'} f_{num}(x', P_\varepsilon)$
6  $\quad$ CUEC - ε - removal$(x, P_\varepsilon)$

FIG.21

```
push-weight(P_ε)
    Q_s ← {q | (q,·) ∈ P_ε} Q_d ← {q | (·,q) ∈ P_ε}, W ← φ
    foreach q_s ∈ Q_s
```
$$Q_n \leftarrow \{q_n \mid (q, q_n) \in P_\varepsilon \wedge q = q_s\}$$
$$W' \leftarrow \varepsilon\text{-distance}(q_s, Q_n)$$
if $\varepsilon\text{-in}(q_s) \neq \phi \vee q_s \in F$
$$W \leftarrow W \cup W'$$
else
$$w_m \leftarrow \left(\bigoplus_{(\cdot,\cdot,w) \in W'} w\right) \oplus \left(\bigoplus_{e \in \text{out}(q_s) \wedge \text{input}(e) \neq \varepsilon} \text{weight}(e)\right)$$
$$W \leftarrow W \cup \{(q_1, q_2, w_m^{-1} \otimes w) \mid (q_1, q_2, w) \in W'\}$$
foreach $e \in \text{out}(q_s)$ such that $\text{input}(e) \neq \varepsilon$
$$\text{weight}(e) \leftarrow w_m^{-1} \otimes \text{weight}(e)$$
foreach $e \in \text{in}(q_s)$ such that $\text{input}(e) \neq \varepsilon$
$$\text{weight}(e) \leftarrow \text{weight}(e) \otimes w_m$$
if $q_s \in I$
$$\lambda(q_s) \leftarrow \lambda(q_s) \otimes w_m$$
foreach $q_d \in Q_d$ such that $\varepsilon\text{-out}(q_d) = \phi \wedge q_d \notin I$
$$w_m \leftarrow \left(\bigoplus_{(\cdot,q,w) \in W \wedge q = q_d} w\right) \oplus \left(\bigoplus_{e \in \text{in}(q_d) \wedge \text{input}(e) \neq \varepsilon} \text{weight}(e)\right)$$
foreach $(q_1, q_2, w) \in W$ such that $q_2 = q_d$
$$W \leftarrow (W \setminus \{(q_1, q_2, w)\}) \cup \{(q_1, q_2, w \otimes w_m^{-1})\}$$
foreach $e \in \text{in}(q_d)$ such that $\text{input}(e) \neq \varepsilon$
$$\text{weight}(e) \leftarrow \text{weight}(e) \otimes w_m^{-1}$$
foreach $e \in \text{out}(q_d)$ such that $\text{input}(e) \neq \varepsilon$
$$\text{weight}(e) \leftarrow w_m \otimes \text{weight}(e)$$
if $q_d \in F$
$$\rho(q_d) \leftarrow w_m \otimes \rho(q_d)$$
$$W \leftarrow \{(q_1, q_2, w) \mid \{(q_1, q_2, w)\} \in W, w \neq 1^\#\}$$
return W

FIG.24

$g_{num}(x, P_\varepsilon, W)$

1   $(Q_{new}, E_{new}, I_{new}, F_{new}, P_\varepsilon') \leftarrow$ make-path $(x, P_\varepsilon, W)$
2   $Q_{old} \leftarrow Q, E_{old} \leftarrow E, I_{old} \leftarrow I, F_{old} \leftarrow F$
3   $Q \leftarrow Q \cup Q_{new}, E \leftarrow E \cup E_{new}, I \leftarrow I \cup I_{new}, F \leftarrow F \cup F_{new}$
4   $N \leftarrow f_{num}(x, P_\varepsilon')$
5   $Q \leftarrow Q_{old}, E \leftarrow E_{old}, I \leftarrow I_{old}, F \leftarrow F_{old}$
6   return $N$

FIG.25 make-path $(x, P_\varepsilon, W)$

1   $Q_{new} \leftarrow \phi, E_{new} \leftarrow \phi$
2   for $i$ from 1 to $|x| - |P_\varepsilon|$
3      $(q_s, q_d, w) \leftarrow w_i$
4      $q_{new} \leftarrow$ create new state
5      $Q_{new} \leftarrow Q_{new} \cup \{q_{new}\}$
6      if $x_{|i|+P_\varepsilon} = 0$
7         $E_{new} \leftarrow E_{new} \cup \{(q_p, a, q_{new}, w_e \otimes w) | (q_p, a, q_s, w_e) \in in(q_s) \wedge a \neq \varepsilon\}$
8         $P_\varepsilon \leftarrow P_\varepsilon \cup \{(q_{new}, q_d)\} \setminus \{(q_s, q_d)\}$
9         if $q_s \in I$
10           $I_{new} \leftarrow I_{new} \cup \{q_{new}\}, \lambda(q_{new}) \leftarrow \lambda(q_s) \otimes w$
11     else
12         $E_{new} \leftarrow E_{new} \cup \{(q_{new}, a, q_n, w \otimes w_e) | (q_d, a, q_n, w_e) \in out(q_d) \wedge a \neq \varepsilon\}$
13         $P_\varepsilon \leftarrow P_\varepsilon \cup \{(q_s, q_{new})\} \setminus \{(q_s, q_d)\}$
14         if $q_d \in F$
15           $F_{new} \leftarrow F_{new} \cup \{q_{new}\}, \rho(q_{new}) \leftarrow w \otimes \rho(q_d)$
16  return $(Q_{new}, E_{new}, I_{new}, F_{new}, P_\varepsilon)$

FIG.26

WFSA - DI - $\varepsilon$ - removal

1   $\Theta \leftarrow$ all - undirected - $\varepsilon$ - closure( )
2   $\Psi \leftarrow$ all - CUEC($\Theta$)
3   foreach $\psi \in \Psi$
4      $P_\varepsilon \leftarrow$ all - $\varepsilon$ - pair($\psi$)
5      $W \leftarrow$ push - weight($P_\varepsilon$)
6      $x \leftarrow \arg\min_{x'} g_{num}(x', P_\varepsilon, W)$
7      $(Q_{new}, E_{new}, I_{new}, F_{new}, P_\varepsilon) \leftarrow$ make - path $(x, P_\varepsilon, W)$
8      $Q \leftarrow Q \cup Q_{new}, E \leftarrow E \cup E_{new}, I \leftarrow I \cup I_{new}, F \leftarrow F \cup F_{new}$
9      WFSA - CUEC - $\varepsilon$ - removal $(x, P_\varepsilon)$

FIG.27

WFSA - CUEC - $\varepsilon$ - removal$(x, P_\varepsilon)$

1   $Q_\varepsilon \leftarrow \{q_s, q_d | (q_s, q_d) \in P_\varepsilon\}, Q_{new} \leftarrow Q, E_{new} \leftarrow E, I_{new} \leftarrow I, F_{new} \leftarrow F, \lambda_{new} \leftarrow \lambda, \rho_{new} \leftarrow \rho$
2   foreach $q \in Q_\varepsilon$
3      $(E_{in}, E_{out}, b_{initial}, b_{final}, \lambda_q, \rho_q,) \leftarrow$ WFSA - make - transition $(q, x, P_\varepsilon)$
4      if $(E_{in} \neq \phi \wedge E_{out} \neq \phi) \vee (b_{initial} = true \wedge E_{out} \neq \phi) \vee (b_{final} = true \wedge E_{in} \neq \phi) \vee (b_{initial} = true \wedge b_{final} = true)$
5         $E_{new} \leftarrow E_{new} \cup E_{in} \cup E_{out}$
6      else
7         $E_{new} \leftarrow E_{new} \setminus (E_{in} \cup E_{out}), Q_{new} \leftarrow Q_{new} \setminus \{q\}, I_{new} \leftarrow I_{new} \setminus \{q\}, F_{new} \leftarrow F_{new} \setminus \{q\}$
8      if $b_{initial} = true$
9         $I_{new} \leftarrow I_{new} \cup \{q\}, \lambda_{new}(q) \leftarrow \lambda_q$
10      if $b_{final} = true$
11         $F_{new} \leftarrow F_{new} \cup \{q\}, \rho_{new}(q) \leftarrow \rho_q$
12      $E_{new} \leftarrow E_{new} \setminus \varepsilon$ - out $(q)$
13   $Q \leftarrow Q_{new}, E \leftarrow \{e \in E_{new} | p(e) \in Q_{new} \wedge n(e) \in Q_{new}\}, I \leftarrow I_{new}, F \leftarrow F_{new}, \lambda \leftarrow \lambda_{new}, \rho \leftarrow \rho_{new}$

FIG.28

WFSA - make - transition $(q, x, P_\varepsilon)$ $\quad b_{initial} \leftarrow q \in I, b_{final} \leftarrow q \in F, \lambda_q \leftarrow \lambda(q), \rho_q \leftarrow \rho(q)$ 1    $E_{in} \leftarrow \{e \mid e \in in(q) \wedge input(e) \neq \varepsilon\}, E_{out} \leftarrow \{e \mid e \in out(q) \wedge input(e) \neq \varepsilon\}$ 2    for i from 1 to $|P_\varepsilon|$ 3      $(q_s, q_d) \leftarrow p_i$ 4      if $q_s = q$ 5        if $x_i = 1$ 6          $E_{out} \leftarrow E_{out} \cup \{(q, input(e), n(e)) \mid e \in out(q_d) \wedge input(e) \neq \varepsilon\}$ 7          if $q_d \in F$ 8            $b_{final} \leftarrow true, \rho_q \leftarrow \rho_q \oplus \rho(q_d)$ 9      if $q_d = q$ 10        if $x_i = 0$ 11          if $q_s \in F$ 12            return $(\phi, \phi, false, false, 1^\#, 1^\#, true)$ 13          $E_{in} \leftarrow E_{in} \cup \{(p(e), input(e), q) \mid e \in in(q_s) \wedge input(e) \neq \varepsilon\}$ 14          if $q_s \in I$ 15            $b_{initial} \leftarrow true, \lambda_q \leftarrow \lambda_q \oplus \lambda(q_s)$ 16    return $(E_{in}, E_{out}, b_{initial}, b_{final}, \lambda_q, \rho_q, false)$

FIG.29

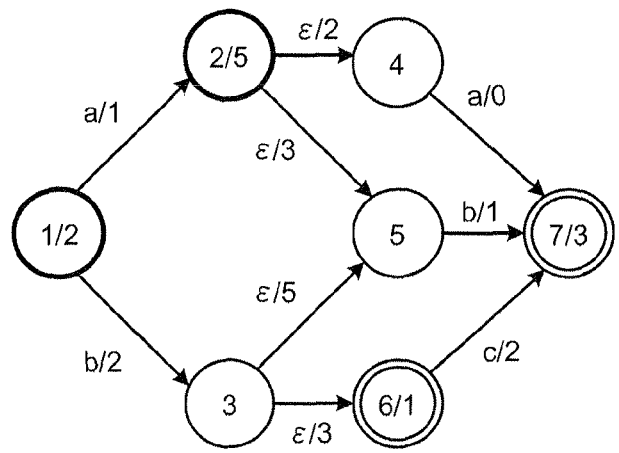

FIG.36 push - output$(P_\varepsilon)$ $Q_s \leftarrow \{q | (q,\cdot) \in P_\varepsilon\} Q_d \leftarrow \{q | (\cdot, q) \in P_\varepsilon\}, O \leftarrow \phi$ 1  foreach $q_s \in Q_s$
2      $Q_n \leftarrow \{q_n | (q, q_n) \in P_\varepsilon \wedge q = q_s\}$
3      $O' \leftarrow \varepsilon\text{-output}(q_s, Q_n)$
4      if $\varepsilon\text{-in}(q_s) \neq \phi \vee q_s \in F$
5          $O \leftarrow O \cup O'$
6      else
7          
8          $o_m \leftarrow \left(\bigoplus_{(\cdot,\cdot,o)\in O'} o\right) \oplus \left(\bigoplus_{e \in out(q_s) \wedge input(e) \neq \varepsilon} output(e)\right)$ 9          $O \leftarrow O \cup \{(q_1, q_2, o_m^{-1} \otimes o) | (q_1, q_2, o) \in O'\}$
10         foreach $e \in out(q_s)$ such that $input(e) \neq \varepsilon$
11             $output(e) \leftarrow o_m^{-1} \otimes output(e)$
12         foreach $e \in in(q_s)$ such that $input(e) \neq \varepsilon$
13             $output(e) \leftarrow output(e) \otimes o_m$
14         if $q_s \in I$
15             $\lambda_o(q_s) \leftarrow \lambda_o(q_s) \otimes o_m$
16  foreach $q_d \in Q_d$ such that $\varepsilon\text{-out}(q_d) = \phi \wedge q_d \notin I$
17      $o_m \leftarrow \left(\bigoplus_{(\cdot, q_d, o) \in O} rev(o)\right) \oplus \left(\bigoplus_{e \in in(q_d) \wedge input(e) \neq \varepsilon} rev(output(e))\right)$ 18      $O' \leftarrow \{(q_1, q_2, o) | (q_1, q_2, o) \in O, q_2 = q_d\}$
19      $O \leftarrow O \setminus O'$
20      $O \leftarrow O \cup \{(q_1, q_2, rev(o_m^{-1} \otimes rev(o))) | (q_1, q_2, o) \in O'\}$
21      foreach $e \in in(q_d)$ such that $input(e) \neq \varepsilon$
22          
23          $output(e) \leftarrow rev(o_m^{-1} \otimes rev(output(e)))$
24      foreach $e \in out(q_d)$ such that $input(e) \neq \varepsilon$
25          $output(e) \leftarrow rev(o_m) \otimes output(e)$
26      if $q_d \in F$
27          $\rho(q_d) \leftarrow rev(o_m) \otimes \rho(q_d)$
28  $O \leftarrow \{(q_1, q_2, o) | (q_1, q_2, o) \in O, o \neq \varepsilon\}$
    return $O$

FIG.37

$\varepsilon$ - output $(q_s, Q_d)$

1. $(Q_o, E_o) \leftarrow \varepsilon$ - DFS$(q_s, \phi, \phi)$, $L \leftarrow \phi$
2. foreach $q \in Q_o$ in topological order by using $E_o$
3.     foreach $e \in \varepsilon$ - in$(q) \cap E_o$
4.         if $L(p(e)) = \phi$
5.             $L(q) \leftarrow L(q) \cup \{\text{output}(e)\}$
6.         foreach $o \in L(p(e))$
7.             $L(q) \leftarrow L(q) \cup \{o \cdot \text{output}(e)\}$
8. $R \leftarrow \phi$
9. foreach $q \in Q_d$
10.     foreach $o \in L(q)$
11.         $R \leftarrow R \cup \{(q_s, q, o)\}$
12. return $R$

FIG.38

$\varepsilon$ - DFS$(q, Q_S, Q_o)$

1. $Q_S \leftarrow Q_S \cup \{q\}$, $Q_o \leftarrow Q_o \cup \{q\}$, $E_o \leftarrow \phi$
2. foreach $e \in \varepsilon$ - out$(q)$
3.     if $n(e) \notin Q_S$
4.         $E_o \leftarrow E_o \cup \{e\}$
5.         if $n(e) \notin Q_o$
6.             $(Q_r, E_r) \leftarrow \varepsilon$ - DFS$(n(e), Q_S, Q_o)$
7.             $Q_o \leftarrow Q_o \cup Q_r$, $E_o \leftarrow E_o \cup E_r$
8. return $(Q_o, E_o)$

INFORMATION PROCESSING DEVICE, INFORMATION PROCESSING METHOD AND COMPUTER PROGRAM PRODUCT

CROSS-REFERENCE TO RELATED APPLICATIONS

This application is a continuation of PCT international application Ser. No. PCT/JP2011/055682 filed on Mar. 10, 2011 which designates the United States, and which claims the benefit of priority from Japanese Patent Application No. 2010-064981, filed on Mar. 19, 2010; the entire contents of which are incorporated herein by reference.

FIELD

Embodiment described herein relate generally to an information processing device, an information processing method and a computer program product.

BACKGROUND

A finite state automaton (FSA) is used in various fields such as natural language processing and speech recognition. For example, the FSA has uses such as searching a specific character string or a specific pattern of character string in text. The FSA may also be referred to as a finite automaton (FA) or a finite state machine (FSM).

There is an extended model of the FSA such as a finite state transducer (FST) that outputs, when an input symbol is input thereto, an output symbol corresponding to the input symbol in a case where output symbols are present in addition to input symbols, for example. The FST may be used for a lexicon in speech recognition, for example. Such a lexicon is constituted as an FST that outputs, when a pronunciation is input thereto, a word corresponding to the pronunciation. In addition, there are also a weighted finite state automaton (WFSA) taking weights for handling probabilities and distances into account in addition to input symbols, and a weighted finite state transducer (WFST) that is a model including both the FST and the WFSA. The WFSA and the WFST may be used as a model for expressing a lexicon or a model necessary for speech recognition such as a language model in speech recognition or may be used for statistical machine translation.

For using the FSA or a model that is an extended version thereof as described above in actual applications thereof, necessary information needs to be converted into the FSA or the extended version thereof. In this case, if using a transition moving to a next state without an input symbol, the conversion can be facilitated in some cases. Such a transition is called an $\epsilon$-transition. The $\epsilon$-transition is assigned with an empty symbol sequence (also referred to as an empty symbol, an empty character string or an empty input) instead of an input symbol. Such an empty symbol sequence is represented by $\epsilon$. A set of states that can be reached only through 0 or more $\epsilon$-transitions from a certain state is called an $\epsilon$-closure. A process of removing $\epsilon$-transitions is called $\epsilon$-removal. The $\epsilon$-removal is performed for the purpose of decreasing the number of unnecessary transitions to reduce the processing time, for example. In order to reduce the amount of memory and the processing time, processing desirably results in as small the number of transitions after $\epsilon$-removal as possible.

U.S. Pat. No. 7,027,988 proposes a technique for removing an $\epsilon$-transition included in a WFSA, an FST and a WFST. In a method of related art including U.S. Pat. No. 7,027,988, the $\epsilon$-removal is realized by obtaining an $\epsilon$-closure in a certain state q and setting an outgoing transition from a state included in the $\epsilon$-closure to an outgoing transition from the state q. When a weight or an output symbol is assigned to a transition, a weight or an output symbol of a transition that is newly generated as a result of the $\epsilon$-removal out of the outgoing transitions from the state q is obtained taking the weight or the output symbol on the transition into account.

In the method for $\epsilon$-removal in related art, however, there is a dependence on the processing direction. Specifically, if the method of the related art is used with the directions of automaton transitions to be processed all reversed, the same result as that before the directions are reversed is not always obtained. This is because states included in $\epsilon$-closure vary. In order to make the number of transitions as small as possible in performing $\epsilon$-removal by using the method of the related art, a method of performing $\epsilon$-removal in both directions and then selecting one with a smaller number of transitions can be considered. In this case, the processing time increases because it is necessary to perform the $\epsilon$-removal in both directions. It is thus desirable to perform $\epsilon$-removal without depending on the direction of $\epsilon$-transition.

BRIEF DESCRIPTION OF THE DRAWINGS

FIG. 2 is a flowchart illustrating an overall flow of an $\epsilon$-removal process according to the first embodiment;

FIG. 3 is a drawing illustrating an example of pseudo codes for obtaining an undirected $\epsilon$-closure;

FIG. 4 is a diagram illustrating an example of the undirected $\epsilon$-closures;

FIG. 9 is a diagram illustrating an example of the $\epsilon$-removal pattern;

FIG. 10 is a drawing illustrating an example of pseudo codes for obtaining all $\epsilon$-tuples included in a connected undirected $\epsilon$-closure $\psi$;

FIG. 11 is a drawing illustrating an example of pseudo codes of a function $f_{num}$;

FIG. 12 is a drawing illustrating an example of pseudo codes of a function make-transition;

FIG. 13 is a drawing illustrating an example of pseudo codes (CUEC-$\epsilon$-removal) of an $\epsilon$-removal;

FIG. 14 is a drawing illustrating an example of pseudo codes of a method for removing all $\epsilon$-transitions included in a finite state automaton;

FIG. 21 is a drawing illustrating an example of pseudo codes (push-weight) of a method for moving weights;

FIG. 24 is a drawing illustrating an example of pseudo codes of a function $g_{num}$;

FIG. 25 is a drawing illustrating an example of pseudo codes of a function make-path;

FIG. 26 is a drawing illustrating an example of pseudo codes (WFSA-DI-ϵ-removal) of a method for removing all ϵ-transitions included in a WFSA;

FIG. 27 is a drawing illustrating an example of pseudo codes (WFSA-CUEC-ϵ-removal) of an ϵ-removal;

FIG. 28 is a drawing illustrating an example of pseudo codes of a function WFSA-make-transition;

FIG. 29 is a diagram illustrating a WFSA before removal;

FIG. 36 is a drawing illustrating an example of pseudo codes (push-output) of a method for moving character strings;

FIG. 37 is a drawing illustrating an example of pseudo codes of a function ϵ-output;

FIG. 38 is a drawing illustrating an example of pseudo codes of a function ϵ-DFS;

DETAILED DESCRIPTION

Figure 1:
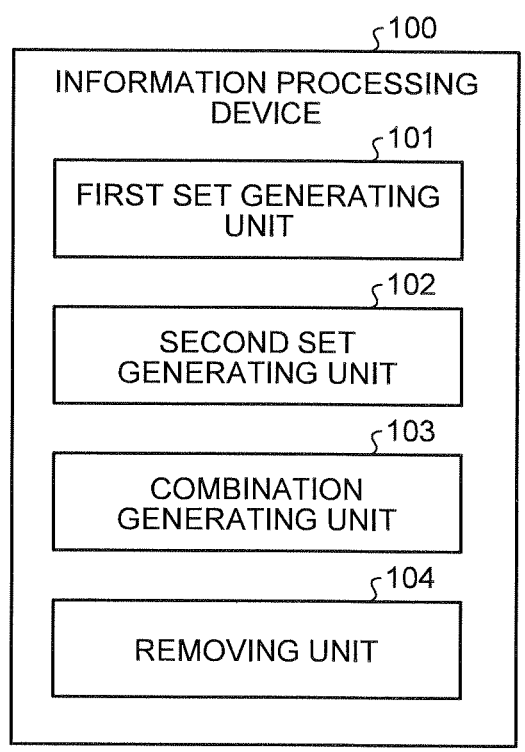
FIG. 1 is a functional block diagram of an information processing device according to a first embodiment.

According to an embodiment, an information processing device includes a first set generating unit, a second set generating unit, a combination generating unit, and a removing unit. The first set generating unit is configured to generate a first set representing a set of states that are reachable by following ϵ-transitions in a forward direction and a reverse direction among states included in a finite state automaton. The second set generating unit is configured to, when a plurality of the first sets are connected with one another by one transition that is not an ϵ-transition, generate a set of states included in each of the first sets connected by one transition that is not an ϵ-transition, and generate a second set representing the generated set and the first set that is not connected to another first set by one transition that is not an ϵ-transition. The combination generating unit configured to generate, for each of the second sets, a combination of removal patterns to be respectively applied to ϵ-transitions between states included in the second set among a plurality of predetermined removal patterns for removing an ϵ-transition, and obtain, among the generated combinations, a combination with which the number of transitions in the second set after removing ϵ-transitions is the smallest. The removing unit configured to remove ϵ-transitions in the second set by the removal patterns included in the obtained combination.

Various embodiments will be described below in detail with reference to the accompanying drawings.

First Embodiment

An information processing device according to a first embodiment searches for a range of states that is affected by a result of selecting a pattern of ϵ-removal (an ϵ-removal pattern), and performs ϵ-removal for each searched range. A range affected by a result of selecting an ϵ-removal pattern is searched for without depending on the direction of ϵ-removal. Accordingly, ϵ-removal can be performed without depending on the direction of an ϵ-transition.

Details of an ϵ-removal pattern will be described here. A state that can be reached from a state $q_s$ only through ϵ-transitions is referred to as a state $q_d$. In order to remove ϵ-transitions between these two states without changing an accepted language, another new transition needs to be generated. The accepted language is a set of input symbol sequences accepted by a finite state automaton. Generation of a transition has a pattern. In the following, this pattern is referred to as an ϵ-removal pattern. There are at least two ϵ-removal patterns.

One of the ϵ-removal patterns is a pattern of reproducing an incoming transition to a state $q_s$ as a transition where the next state is a state $q_d$. Another of the ϵ-removal patterns is a pattern of reproducing an outgoing transition from a state $q_d$ as a transition where the previous state is a state $q_s$. The final number of transitions varies depending of which ϵ-removal pattern is selected. In addition, a result of selecting an ϵ-removal pattern may be affected by a result of selecting an ϵ-removal pattern between other two states. Accordingly, in the first embodiment, ranges in which this selection is affected by one another are first searched for. Details of the first embodiment will be described below.

FIG. 1 is a block diagram illustrating an example of a functional configuration of an information processing device 100 according to the first embodiment. As illustrated in FIG. 1, the information processing device 100 includes a first set generating unit 101, a second set generating unit 102, a combination generating unit 103 and a removing unit 104.

The first set generating unit 101 generates an undirected ϵ-closure representing a set (first set) of states that can be reached by following ϵ-transitions in a forward direction and in a reverse direction among states included in a finite state automaton to be processed.

The second set generating unit 102 generates a connected undirected ϵ-closure (CUEC) representing a set (second set) of undirected ϵ-closures connected directly or indirectly to other undirected ϵ-closures. The second set generating unit 102 also includes a set consisting of one undirected ϵ-closure that is not directly connected to any other undirected ϵ-closure in the connected undirected ϵ-closure. The meanings of direct connection and indirect connection will be described later. The connected undirected ϵ-closure corresponds to a range in which selections of ϵ-removal patterns are affected by one another, ϵ-removal is performed on such a connected undirected ϵ-closure to be processed and performed for each connected undirected ϵ-closure.

The combination generating unit 103 obtains, for each connected undirected ϵ-closure, a combination with the smallest number of transitions in the connected undirected ϵ-closure after removal of ϵ-transitions among combinations of removal patterns to be applied to each ϵ-transition between states included in the connected undirected ϵ-closure.

The removing unit 104 performs ϵ-removal of each ϵ-transition in the connected undirected ϵ-closure with the removal patterns included in the generated combination.

Next, an ϵ-removal process performed by the information processing device 100 thus configured according to the first embodiment will be described with reference to FIG. 2. FIG. 2 is a flowchart illustrating an overall flow of the ϵ-removal process according to the first embodiment.

First, the first set generating unit 101 searches for states and transitions in an input finite state automaton (FSA) and generates an undirected ϵ-closure (step S101). Next, the second set generating unit 102 generates a connected undirected ϵ-closure from generated undirected ϵ-closures (step S102). Next, the combination generating unit 103 searches for a combination of ϵ-removal patterns with the smallest number of transitions among combinations of ϵ-removal patterns that can be applied to ϵ-transitions in a connected undirected ϵ-closure (step S103).

When the total number of combinations is small, the combination generating unit 103 searches all the combinations. When the total number of combinations is so large that the combinations cannot be checked in a realistic time, the combination generating unit 103 searches only some combinations and selects a combination with the smallest number of transitions thereamong.

Next, the removing unit 104 performs ϵ-removal with the removal patterns included in the selected combination (step S104). Specifically, ϵ-transitions corresponding to the removal patterns included in the selected combination are removed, and transitions relating to states that become unreachable from an initial state are removed.

Next, the combination generating unit 103 determines whether or not processing of all connected undirected ϵ-closures is completed (step S105). If the processing is not completed (step S105: No), the combination generating unit 103 repeats processing on unprocessed connected undirected ϵ-closures (step S103). If the processing is completed (step S105: Yes), the ϵ-removal process is completed. As a result of the process above, a FSA in which no ϵ-transitions exits can be obtained.

Details of the steps in FIG. 2 will be described below.

Preliminaries

A FSA is composed of a 5-tuple sets (Q, E, Σ, I, F) including a set Q of states, a set E of transitions, a set Σ of input symbols, a set I of initial states and a set F of final states. A transition is composed of a 3-tuple (previous state, input symbol, next state). These five sets can be always referred as information constituting the FSA to be subjected to ϵ-removal. For example, this information is stored in a storage unit or the like (not illustrated) in a manner that this information can be always referred to from pseudo codes example of which are given below.

An empty set is represented by Φ. The number of elements in a set B is represented by |B|. A path consisting only of ϵ-transitions is defined as an ϵ-path.

A set of states that can be reached from a certain state by following one or more ϵ-transitions regardless of the directions of the transitions is referred to as an undirected ϵ-closure. States that are included in undirected ϵ-closures $C_1$ and $C_2$, respectively, are represented by $q_1$ and $q_2$. When $q_1$ and $q_2$ are connected by only one transition that is not an ϵ-transition, the undirected ϵ-closures $C_1$ and $C_2$ are referred to as being directly connected. In a case of undirected ϵ-closures $C_1$, $C_2$ and $C_3$, when $C_1$ and $C_2$ are connected and $C_2$ and $C_3$ are also connected, $C_1$ and $C_3$ are referred to as being indirectly connected.

A set of undirected ϵ-closures that are directly or indirectly connected and a set of one undirected ϵ-closure that is not directly connected to any other undirected ϵ-closure are referred to as connected undirected ϵ-closures. In other words, a connected undirected ϵ-closure is composed of one or more undirected ϵ-closure, and when a connected undirected ϵ-closure includes two or more undirected ϵ-closures, these are directly or indirectly connected.

States included in a range in which selections of ϵ-removal patterns are affected by one another are the same as states included in a connected undirected ϵ-closure. In a case of two undirected ϵ-closures that are not connected, that is, two undirected ϵ-closures having two or more transitions that are not ϵ-transitions therebetween, an ϵ-removal pattern included in one undirected ϵ-closure never affects an ϵ-removal pattern included in the other undirected ϵ-closure.

Methods

First, a method for obtaining a range in which selections of ϵ-removal patterns are affected by one another will be described, and how an ϵ-removal pattern is selected will be described next. Finally, a method for removing ϵ-transitions on the basis of the selected ϵ-removal pattern will be described.

Method for Obtaining an Undirected ϵ-Closure: Step S101

Search is performed by a depth first search (DFS) regarding incoming ϵ-transitions to each state as also being outgoing ϵ-transitions therefrom. Transitions to be searched for here are only ϵ-transitions. When search is completed for all states that need to be searched, undirected ϵ-closures are obtained.

FIG. 3 is a drawing illustrating an example of pseudo codes for obtaining undirected ϵ-closures. Herein, Θ is a set of undirected ϵ-closures. S represents a stack, and an element last input thereto by a function push is taken out therefrom first by a function pop. input(e), n(e) and p(e) represent an input symbol, a next state and a previous state, respectively, assigned to a transition e. The pseudo codes (all-undirected-ϵ-closure) in FIG. 3 are executed by the first set generating unit 101.

On line 1, all states included in a FSA to be processed are assigned to $Q_r$. At this point, Q is equal to $Q_r$. In addition, Θ is initialized as an empty set, and the stack S is emptied.

On line 2, whether $Q_r$ is an empty set or not is checked, and if $Q_r$ is an empty set, the process proceeds to line 17. If $Q_r$ is not an empty set, this means that there remains a state to be processed, and thus the process proceeds to line 3.

On line 3, $Q_\epsilon$ that will be used in subsequent processing is initialized to an empty set.

On line 4, any one state is selected from the set $Q_r$ and assigned to the state q. The selection may be performed in any manner, and examples of the method for the selection include random selection, selection from the smallest state number, and selection from the largest state number.

On line 5, the state q is added to the stack S.

On line 6, whether the stack S is an empty set or not is checked, and if the stack S is an empty set, the process proceeds to line 14. Otherwise, the process proceeds to line 7.

On line 7, one element is taken out from the stack S and assigned to $q_\epsilon$. The assigned $q_\epsilon$ is removed from the stack S.

On line 8, $q_\epsilon$ is added to $Q_\epsilon$.

Line 9 expresses that processing from line 10 to line 13 is executed for all transitions to which ϵ is assigned as an input symbol. Transitions to be processed in lines 10 to 13 are represented by e.

On line 10, it is determined whether $q_\epsilon$ is equal to the previous state of a transition e and the next state of the transition e is not included in $Q_\epsilon$. If the determination is positive, the process proceeds to line 11. Otherwise, the process proceeds to line 12.

On line 11, the next state of the transition e is added to the stack S.

On line 12, it is determined whether the next state of the transition e is equal to $q_\epsilon$ and the previous state of the transition e is not included in $Q_\epsilon$. If the determination is positive, the process proceeds to line 13. Otherwise, the process returns to line 9.

On line 13, the previous state of the transition e is added to the stack S. Then, the process returns to line 9.

On line 14, a state included in $Q_\epsilon$ is removed from $Q_r$.

On line 15, it is determined whether or not the number of states included in $Q_\epsilon$ is two or larger. If the number is two or larger, the process proceeds to line 16. Otherwise, the process returns to line 2.

At the time when the process proceeds up to line 16, $Q_\epsilon$ has become one of undirected $\epsilon$-closures included in the FSA to be processed. On line 16, $Q_\epsilon$ is added to the set $\Theta$ having undirected $\epsilon$-closures as elements. Then, the process returns to line 2.

On line 17, the set $\Theta$ obtained by this processing is returned as a processing result.

FIG. 4 is a diagram illustrating an example of undirected $\epsilon$-closures that can be obtained as a result of such processing. Parts surrounding by dotted lines in FIG. 4 are undirected $\epsilon$-closures. With this example, a result obtained by the method illustrated in FIG. 3 will be $\Theta=\{\{1, 2\}, \{3, 4\}, \{6, 7, 8\}\}$. A state is represented by a circle, and a transition is represented by an arrow connecting states. A thick-line circle represents an initial state and a double-line circle represents a final state. Note that this finite state automaton can only accepts an input aaa.

Method for Obtaining a Connected Undirected $\epsilon$-Closure: Step S102

Figures 5, 6:
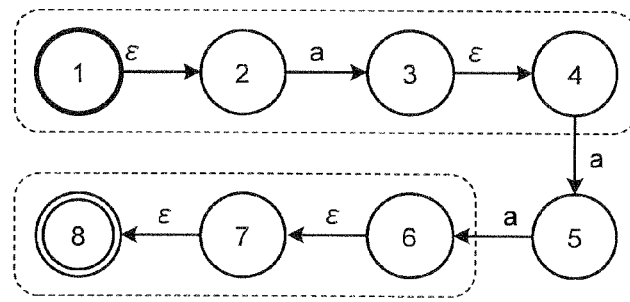
FIG. 5 is a drawing illustrating an example of pseudo codes for obtaining connected undirected $\epsilon$-closures.
FIG. 6 is a diagram illustrating an example of the connected undirected $\epsilon$-closures.

FIG. 5 is a drawing illustrating an example of pseudo codes for obtaining all connected undirected $\epsilon$-closures included in the FSA to be processed.

On line 1, a set $\Psi$ including connected undirected $\epsilon$-closures as elements is initialized to an empty set.

Line 2 expresses that processing from line 3 to line 13 is executed for all elements of undirected $\epsilon$-closures included in $\Theta$ that is a specified set of undirected $\epsilon$-closures. An undirected $\epsilon$-closure to be processed is represented by $\theta$.

On line 3, a set $\psi$ having undirected $\epsilon$-closures as elements is initialized to a set having $\theta$ as elements.

Line 4 expresses that lines 5 to 8 are processed for all states included in $\theta$. In lines 5 to 8, a state to be processed is represented by q.

Line 5 expresses that lines 6 to 8 are processed on elements other than $\theta$ that are included in $\Theta$. An element to be processed is represented by $\theta'$.

Line 6 expresses that lines 7 and 8 are processed on all states included in $\theta'$. A state to be processed is represented by q'.

On line 7, it is determined whether or not a transition with the previous state q and the next state q' or a transition with the next state q and the previous state q' is present among transitions that are not $\epsilon$-transitions. If such a transition is present, the process proceeds to line 8.

On line 8, $\theta'$ is added to $\psi$.

Lines 4 to 8 correspond to collecting undirected $\epsilon$-closures that are directly connected to the undirected $\epsilon$-closure $\theta$ to $\psi$.

When the series of processing on lines 4 to 8 is completed, the process proceeds to line 9. Line 9 expresses that processing from line 10 to line 12 is executed for all elements included in $\Psi$. An element to be processed in the processing from lines 10 to 12 is represented by $\psi'$.

On line 10, it is determined whether or not a product set of $\psi$ and $\psi'$ is an empty set. If the product set is an empty set, the process returns to line 9. Otherwise, the process proceeds to line 11.

On line 11, undirected $\epsilon$-closures that are elements included in $\psi'$ are added to $\psi$.

On line 12, $\psi'$ is removed from $\Psi$.

The processing from line 9 to line 12 corresponds to processing for finding, from undirected $\epsilon$-closures that are directly connected, undirected $\epsilon$-closures that are indirectly connected.

On line 13, $\psi$ is added to $\Psi$.

On line 14, the set $\Psi$ having, as elements, the connected undirected $\epsilon$-closures obtained by the processing on lines 1 to 13 is returned as a processing result.

FIG. 6 is a diagram illustrating an example of the connected undirected $\epsilon$-closures obtained by such processing. Parts surrounding by dotted lines in FIG. 6 are the connected undirected $\epsilon$-closures. The upper connected undirected $\epsilon$-closure in FIG. 6 is a connected undirected $\epsilon$-closure resulting from two undirected $\epsilon$-closures being connected only by one transition that is not an $\epsilon$-transition. The lower connected undirected $\epsilon$-closure in FIG. 6, on the other hand, is not included in the upper connected undirected $\epsilon$-closure because the lower one is connected with the upper one by two transitions that are not $\epsilon$-transitions, but constitutes a connected undirected $\epsilon$-closure alone.

$\epsilon$-Removal Pattern

Figure 7:
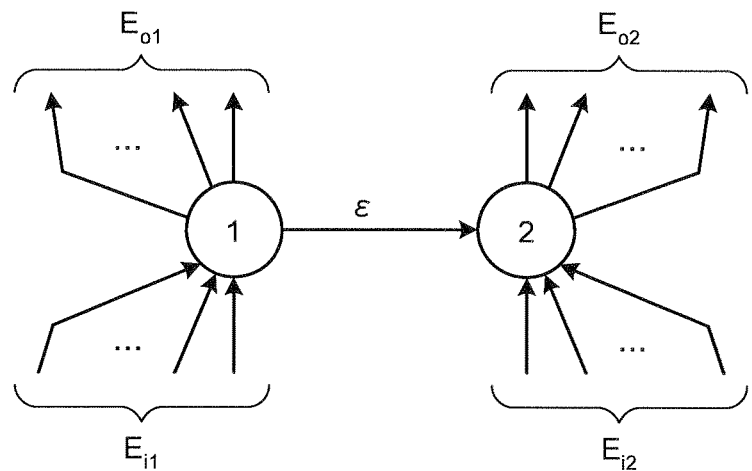
FIG. 7 is a diagram illustrating an example of an $\epsilon$-transition.
Figure 8:
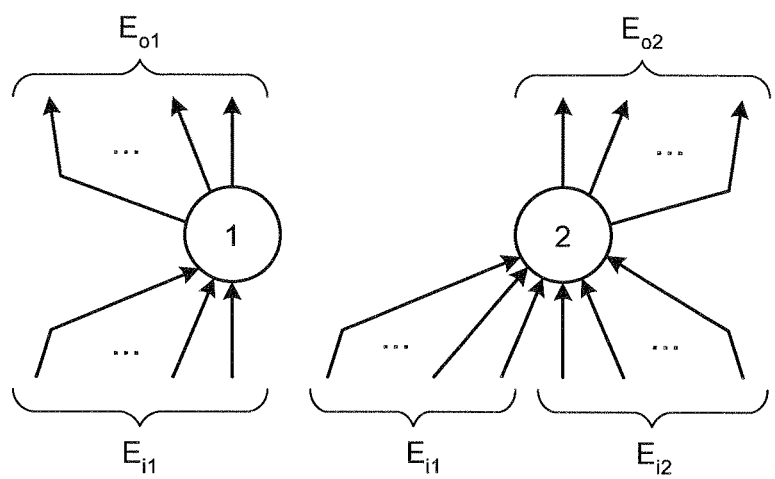
FIG. 8 is a diagram illustrating an example of an $\epsilon$-removal pattern.

Details of $\epsilon$-removal patterns will be further described here with reference to FIGS. 7 to 9. FIG. 7 is a diagram illustrating an example of an $\epsilon$-transition. FIGS. 8 and 9 are diagrams illustrating examples of $\epsilon$-removal patterns.

Two states $q_1$ and $q_2$ that are connected by an $\epsilon$-path are considered. Sets of incoming transitions and outgoing transitions to/from $q_1$ are represented by $E_{i1}$ and $E_{o1}$, respectively, and sets of incoming transitions and outgoing transitions to/from $q_2$ are represented by $E_{i2}$ and $E_{o2}$, respectively (see FIG. 7). In order that a FSA with all $\epsilon$-transitions between $q_1$ and $q_2$ removed operates in the same manner as the original FSA, next states and previous states of transitions included in $E_{i1}$, $E_{i2}$, $E_{o1}$ and $E_{o2}$ need to be changed or to be copied and changed.

Two $\epsilon$-removal patterns that are patterns for generating transitions required for transformation so as to accept the same language even when $\epsilon$-transitions are removed can be considered. One is a pattern reproducing $E_{i1}$ as illustrated in FIG. 8, and the other is a pattern reproducing $E_{o2}$ as illustrated in FIG. 9.

Hereinafter, the patterns in FIGS. 8 and 9 are referred to as an $\epsilon$-removal pattern 0 and an $\epsilon$-removal pattern 1, respectively. In a case where the number of $\epsilon$-transitions is simply only one as illustrated in FIG. 7, the one with a smaller number of included transitions of $E_{o2}$ and $E_{i1}$ may be copied when $|E_{o1}|>0$ and $|E_{i2}|>0$ are satisfied. When $|E_{o1}|=0$ is satisfied, $E_{i1}$ may be moved to a state 2, while when $|E_{i2}|=0$ is satisfied, $E_{o2}$ may be moved to a state 1. When $|E_{o1}|=0$ and $|E_{i2}|=0$ are satisfied, the result will be the same whichever is moved.

In a case of an undirected $\epsilon$-closure including three or more states, however, even if an $\epsilon$-removal pattern with which the number of transitions is most reduced when one $\epsilon$-path is removed is selected, the $\epsilon$-removal pattern may not be a pattern with the smallest number of transitions as a whole including removal of other ϵ-paths. A combination with the smallest number of transitions can be found by checking all the combinations.

The total number of ϵ-removal patterns that are included in the connected undirected ϵ-closure and that need to be selected is represented by N, and a variable for recording which of the ϵ-removal pattern 0 or the ϵ-removal pattern 1 is selected in the selection of an i-th ϵ-removal pattern is represented by $x_i$. An arrangement of N variables $x_i$ will be $x_1 x_2 x_3 \ldots x_N$, which can be recorded as an arrangement. This is referred to as an ϵ-removal pattern arrangement x.

Listing of ϵ-Removal Patterns that Need to be Selected

In step S103, the combination generating unit 103 first lists all the ϵ-removal patterns that need to be selected. Details thereof will be described below.

A 2-tuple including a state included in a connected undirected ϵ-closure and a state that can be reached therefrom by following one or more ϵ-transitions in the forward direction will be referred to as an ϵ-tuple. Since one ϵ-removal pattern has to be selected for one ϵ-tuple, all the ϵ-removal patterns that need to be selected will be listed if all the ϵ-tuples can be listed.

FIG. 10 is a drawing illustrating an example of pseudo codes for obtaining all ϵ-tuples included in a connected undirected ϵ-closure ψ. ϵ-out(q) represents a set consisting only of ϵ-transitions among outgoing transitions from a state q.

On line 1, a set $P_\epsilon$ and a stack S are initialized to empty sets.

Line 2 expresses that lines 3 to 10 are processed on all elements of a set ψ having undirected ϵ-closures as elements. An undirected ϵ-closure to be processed from line 3 to line 10 is represented by θ.

Line 3 expresses that lines 4 to 10 are processed on all states included in the undirected ϵ-closure θ. A state to be processed in the processing from line 4 to line 10 is represented by q.

On line 4, q is added to the stack S and $Q_s$ is initialized to an empty set.

On line 5, it is determined whether the stack S is an empty set. If the stack S is an empty set, the process returns to line 3. Otherwise, the process proceeds to line 6.

On line 6, a state is taken out from the stack S and assigned to $q_s$.

On line 7, $q_s$ is added to $Q_s$.

On line 8, processing on lines 9 and 10 is executed on transitions e with the next states not being included in $Q_s$ among outgoing ϵ-transitions from $q_s$.

On line 9, a 2-tuple two states including q and the next state of a transitions e is added to $P_\epsilon$.

On line 10, the next state of the transition e is added to the stack S.

When all processing from line 1 to line 10 is completed, the ϵ-tuple is recorded in $P_\epsilon$, and $P_\epsilon$ is thus returned as a processing result on line 11.

Calculation of the Number of Transitions after ϵ-Removal

Next, the combination generating unit 103 calculates the number of transitions after ϵ-removal. Details thereof will be described below.

A function $f_{num}(x, P_\epsilon)$ for calculating the number of transitions after removing ϵ-transitions in a connected undirected ϵ-closure on the basis of an ϵ-removal pattern arrangement x is considered. $P_\epsilon$ is a set consisting of a 2-tuple obtained in FIG. 10 that corresponds to x. In other words, an ϵ-removal pattern corresponding to the i-th ϵ-tuple of $P_\epsilon$ will be recorded on the i-th element of the ϵ-removal pattern arrangement x. Thus, with the length of x (number of elements) represented by |x| and the number of elements of $P_\epsilon$ represented by $|P_\epsilon|$, |x| and $|P_\epsilon|$ are equal. Since only the numbers of incoming transitions and outgoing transitions to/from each state need to be known, this can be realized by a method including FIGS. 11 and 12. FIG. 11 is a drawing illustrating an example of pseudo codes of a function $f_{num}$. FIG. 12 is a drawing illustrating an example of pseudo codes of a function make-transition to be executed in the function $f_{num}$.

When ϵ-removal in a certain unconnected undirected ϵ-closure is to be performed using the ϵ-removal pattern arrangement x, $f_{num}(x, P_\epsilon)$ as in FIG. 11 is called.

On line 1, a set $E_{ne}$ of transitions after ϵ-removal is initialized to an empty set. In addition, all states included as a 2-tuple consisting of states in $P_\epsilon$ are assigned to $Q_\epsilon$.

Line 2 expresses that lines 3 to 7 are processed on all states q included in $Q_\epsilon$.

On line 3, the function make-transition is called where a first argument is q, a second argument is x and a third argument is $P_\epsilon$, and results thereof are obtained as $E_{in}$, $E_{out}$, $b_{initial}$, $b_{final}$ and $b_{error}$. $E_{in}$ is a set of incoming transitions to the state q after ϵ-removal, $E_{out}$ is a set of outgoing transitions from the state q after ϵ-removal, $b_{initial}$ is a value representing whether or not the state q is the initial state after ϵ-removal, $b_{final}$ is a value representing whether the state q is the final state after ϵ-removal, and $b_{error}$ is a value representing whether the language to be accepted after ϵ-removal is changed.

On line 4, it is determined whether the accepted language is changed. If $b_{error}$ is false, the process proceeds to line 6. If $b_{error}$ is true, the process proceeds to line 5.

On line 5, an infinite value or a maximum value that $f_{num}(x, P_\epsilon)$ can return is returned as an error and the process is completed.

On line 6, it is determined whether or not to proceed to line 7. If neither of $E_{in}$ and $E_{out}$ is an empty set or if $b_{initial}$ is true and $E_{out}$ is not an empty set or if $b_{final}$ is true and $E_{in}$ is not an empty set, the process proceeds to line 7. Otherwise, the process returns to line 2.

On line 7, $E_{in}$ and $E_{out}$ are added to $E_{ne}$.

On line 8, the number of transitions included in $E_{ne}$ obtained by the processing from line 1 to line 7 is returned as a processing result.

Next, the function make-transition in FIG. 12 will be described.

On line 1, $b_{initial}$ is initialized to true if q is the initial state or to false otherwise. Similarly, $b_{final}$ is initialized to true if q is the final state or to false otherwise.

On line 2, an incoming transition to the state q among transitions other than ϵ-transitions is assigned to $E_{in}$. Similarly, an outgoing transition from the state q among transitions other than ϵ-transitions is assigned to $E_{out}$.

Line 3 expresses that processing from line 4 to line 16 is repeated with the value of a variable i incremented by 1 from 1 to the number of elements of $P_\epsilon$.

On line 4, states included, in a 2-tuple that are the i-th elements among the elements included in $P_\epsilon$ are assigned to $q_s$ and $q_d$, respectively. $q_d$ is a state that is reachable from $q_s$ by following ϵ-transitions in the forward direction.

On line 5, it is determined whether or not $q_s$ is in the same state as q. If $q_s$ is not in the same state, the process proceeds to line 10. If $q_s$ is in the same state, the process proceeds to line 6.

On line 6, it is determined whether the i-th value of the ϵ-removal pattern arrangement x is 1. If the i-th value is not 1, the process proceeds to line 10. If the i-th value is 2, the process proceeds to line 7. When $x_i$ is 1, this means that the ϵ-removal pattern 1 is selected. In other words, this means that an outgoing transition from $q_d$ is copied as an outgoing transition from $q_s$.

On line 7, transitions other than ϵ-transitions among outgoing transitions from $q_d$ are added to $E_{out}$ as outgoing transitions from q.

On line 8, it is determined whether or not $q_d$ is the final state. If $q_d$ is not the final state, the process proceeds to line 10. Otherwise, the process proceeds to line 9.

On line 9, $b_{final}$ is assigned with true. Then, the process proceeds to line 10.

On line 10, it is determined wither or not $q_d$ and q are equal. If $q_d$ and q are equal, the process proceeds to line 11. Otherwise, the process returns to line 3.

On line 11, it is determined whether the i-th value of the ϵ-removal pattern arrangement x is 0. If the i-th value is not 0, the process returns to line 3. If the i-th value is 0, the process proceeds to line 12. When $x_i$ is 0, this means that the ϵ-removal pattern 0 is selected. In other words, this means that an incoming transition to $q_s$ is copied as an incoming transition to $q_d$.

On line 12, it is determined whether or not $q_s$ is the final state. If $q_s$ is not the final state, the process proceeds to line 14, or otherwise to line 13.

When line 13 is processed, this means that a language different from the original FSA becomes acceptable, and ϵ-removal cannot be performed successfully. Accordingly, it has to be made sure that the ϵ-removal pattern arrangement x received as arguments are not used. Thus, a fifth value of a 5-tuple of a return value is set to true to inform the caller of the same. Since the other values in the 5-tuple are not used, the other values may be any values.

On line 14, transitions other than s-transitions among incoming transitions to $q_s$ are added to $E_{in}$ as incoming transitions to q.

On line 15, it is determined whether or not $q_s$ is the initial state. If $q_s$ is the initial state, the process proceeds to line 16. Otherwise, the process returns to line 3.

On line 16, $b_{initial}$ is assigned with true.

When the repetition of the processing from line 3 to line 16 is completed, the process proceeds to line 17.

On line 17, a result of the processing from line 1 to line 16 is returned as a 5-tuple. The first of the 5-tuple is set to $E_{in}$, the second thereof is set to $E_{out}$, the third thereof is set to $b_{initial}$, the fourth thereof is set to $b_{final}$, and since no transformation that accepts a different language is caused, the fifth thereof is set to false.

out(q) represents a set of outgoing transitions from the state q, and in(q) represents a set of incoming transitions to the state q. $x_i$ is the i-th element of the ϵ-removal pattern arrangement x corresponding to the i-th ϵ-combination included in $P_\epsilon$.

The combination generating unit 103 obtains values of $f_{num}(x, P_\epsilon)$ for various values of x and obtains a value of x with the smallest value of $f_{num}(x, P_\epsilon)$. The removing unit 104 can remove ϵ-transitions without depending on the direction of ϵ-removal by generating and discarding transitions on the basis of thus obtained x. When the combination generating unit 103 calculates all possible values of the ϵ-removal pattern arrangement x, the number of transitions after removing ϵ-transitions can be made minimum. The number of all combination is, however, $2^{|x|}$. If the calculation cannot be performed for all possible values because |x| is too large, the combination generating unit 103 may calculate $f_{num}(x, P_\epsilon)$ only for some combinations and select a value of x with the smallest value of $f_{num}(x, P_\epsilon)$.

For example, a method of calculating only two patterns with all 1 and with all 0 and using the one with a smaller value of $f_{num}(x, P_\epsilon)$ can be applied. Alternatively, a common technique used in combination optimization problem. such as a genetic algorithm may be applied since x is only an arrangement of 0 and 1.

Generation and Discarding of Transitions Resulting from ϵ-Removal: Step S104

When the value of the ϵ-removal pattern arrangement x is determined, the removing unit 104 performs ϵ-removal by which transitions are generated and discarded on the basis of the ϵ-removal pattern arrangement x. FIG. 13 is a drawing illustrating an example of pseudo codes (CUEC-ϵ-removal) of an ϵ-removal.

On line 1, all of the states constituting a 2-tuple included in $P_\epsilon$ are assigned to $Q_\epsilon$. In addition, Q, E, I and F are assigned to $Q_{new}$, $E_{new}$, $I_{new}$ and $F_{new}$, respectively.

Line 2 expresses that a state included in $Q_\epsilon$ is represented by q, and processing from line 3 to line 12 is repeated for all the states included in $Q_\epsilon$.

On line 3, the function make-transition is called where a first argument is q, a second argument is x and a third argument is $P_\epsilon$. The result thereof is returned as a 5-tuple, but the fifth value is not used. The first value is a set $E_{in}$ of incoming transitions to q after ϵ-removal, the second value is a set $E_{out}$ of outgoing transitions from q after ϵ-removal, the third value is a value $b_{initial}$ representing whether or not q is the initial state after ϵ-removal, and the fourth value is a value $b_{final}$ representing whether or not q is the final state after ϵ-removal. The part corresponding to the fifth value that is not used here is represented by "•", and hereinafter, such part corresponding to a value that is not used included in a tuple, if any, will be represented by "•".

Line 4 expresses that $E_{in}$ and $E_{out}$ are added to $E_{new}$ on line 5 if any of the following four conditions (1) to (4) is satisfied:
(1) Neither $E_{in}$ nor $E_{out}$ is an empty set;
(2) $b_{initial}$ is true and $E_{out}$ is not an empty set;
(3) $b_{final}$ is true and $E_{in}$ is not an empty set; and
(4) $b_{initial}$ is true and $b_{final}$ is true.

If the conditions on line 4 are not satisfied, line 7 is executed to remove $E_{in}$ and $E_{out}$ from $E_{new}$. Furthermore, q is removed from $Q_{new}$ constituting the FSA to be processed. If q is the initial state or the final state, q is also removed from $I_{new}$ and $F_{new}$.

If $b_{initial}$ is true on line 8, the state q is added to $I_{new}$ that is a set of initial states on line 9.

If $b_{final}$ is true on line 10, the state q is added to $F_{new}$ that is a set of final states on line 11.

On line 12, outgoing ϵ-transitions from the state q are removed from $E_{new}$. On line 13, $Q_{new}$, $E_{new}$, $I_{new}$ and $F_{new}$ that are changed as a result of repeating the processing from line 3 to line 12 are assigned to Q, E, I and F, respectively. As for $E_{new}$, note that only transitions with the previous states and the next states included in $Q_{new}$ are assigned to E.

Method for Removing all ϵ-Transitions

A method (DI-ϵ-removal) for removing all ϵ-transitions included in a finite state automaton can be constituted by combining the methods described above. FIG. 14 is a drawing illustrating an example of pseudo codes of a method for removing all ϵ-transitions included in a finite state automaton. FIG. 14 is an example of pseudo codes corresponding to the ϵ-removal process in FIG. 2.

On line 1, undirected ϵ-closures are calculated by all-undirected-ϵ-closure( ) (FIG. 3), and the calculation result is assigned to Θ.

On line 2, connected undirected ϵ-closures are calculated by all-CUEC(Θ) (FIG. 5), and the calculation result is assigned to Ψ. The elements of Ψ are connected undirected ϵ-closures ψ, and processing from line 4 to line 6 is repeated on all the elements included in Ψ.

On line 4, ε-tuples included in ψ are obtained by all-ε-pair (ψ) (FIG. 10), and the result is assigned to $P_ε$. On line 5, x' that minimizes $f_{num}(x', P_ε)$ (FIG. 11) or makes $f_{num}(x', P_ε)$ sufficiently small is calculated and the result is assigned to the ε-removal pattern arrangement x. All combinations of x may be checked or only some of the combinations may be checked.

On line 6, ε-transitions are removed from the FSA to be processed on the basis of x obtained on line 5 by CUEC-ε-removal(x, $P_ε$) (FIG. 13).

When the processing from line 4 to line 6 is completed for all the connected undirected ε-closures, the ε-removal of the first embodiment is completed.

Example of Processes

Figure 15:
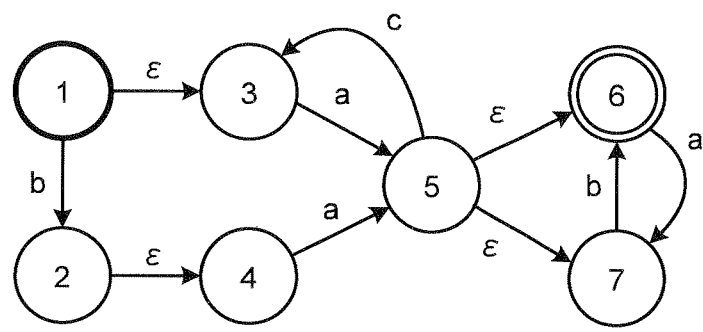
FIG. 15 is a diagram illustrating a FSA before $\epsilon$-removal.

Next, an example of processes according to a method of the related art and according to the first embodiment will be described. FIG. 15 is a diagram illustrating a FSA before ε-removal used in this example. A thick-line circle represents an initial state, which is referred to as a state 1 here. A double-line circle represents a final state, which is referred to as a state 6 here. Characters written near transitions are assigned input symbols. The total number of transitions before removing ε-transitions is ten.

Figure 16:
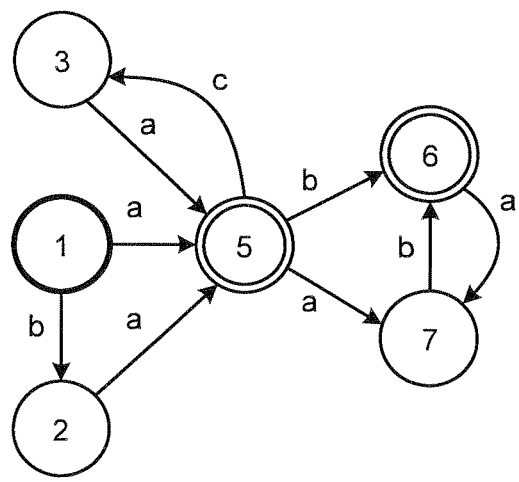
FIG. 16 is a diagram illustrating a result of performing $\epsilon$-removal by a method of the related art.

FIG. 16 is a diagram illustrating a result of performing ε-removal by a method of the related art. As illustrated in FIG. 16, the total number of transitions after performing ε-removal by the method of the related art is nine.

Figure 17:
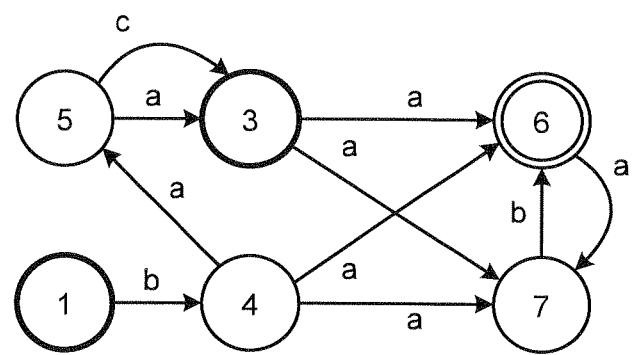
FIG. 17 is a diagram illustrating a result of performing $\epsilon$-removal by the method of the related art after reversing the directions of transitions.

FIG. 17 is a diagram illustrating a result of performing ε-removal by the method of the related art after reversing the directions of transitions. Specifically, FIG. 17 illustrates a FSA in a case in which ε-removal according to the method of the related art is performed after the directions of transitions are reversed and after initial states and final states are replaced with each other, the directions of transitions are returned to the original directions, and the initial states and the final states are returned to the original states. As illustrated in FIG. 17, the total number of transitions after ε-removal in this case is ten.

Figure 18:
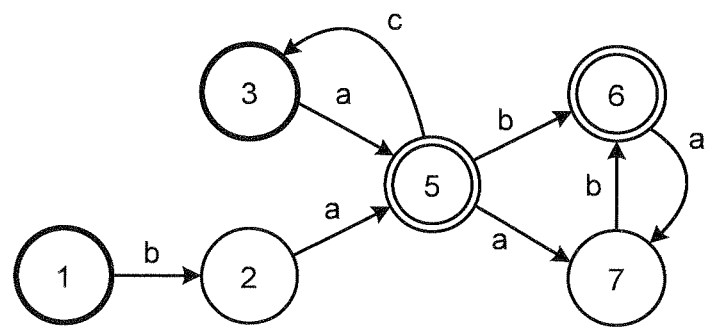
FIG. 18 is a diagram illustrating a result of performing $\epsilon$-removal by a method described in the first embodiment.

FIG. 18 is a diagram illustrating a result of performing ε-removal by the method described in the first embodiment. As illustrated in FIG. 18, the total number of transitions after performing ε-removal by the method of the first embodiment is eight.

Specific process procedures will be described below by using pseudo codes.

The process starts by a pseudo code on line 1 in FIG. 14. On line 1, all undirected ε-closures are obtained by using a function all-undirected-ε-closure. As a result, Θ={{1, 3}, {2, 4}, {5, 6, 7}} is obtained. Further, connected undirected ε-closures are obtained by a function all-CUEC using this Θ as an input thereto. Specifically, Ψ={{1, 3}, {2, 4}, {5, 6, 7}} is obtained. In the case of this example, all the states are included in one connected undirected ε-closure. Accordingly, lines 4 to 6 in FIG. 14 are executed only on the connected undirected ε-closure composed of sets of states {{1, 3}, {2, 4}, {5, 6, 7}}. On line 4, all ε-tuples are obtained. As a result, $P_ε$={(1, 3), (2, 4), (5, 6), (5, 7)} is obtained.

When a first tuple is (1, 3), a second tuple is (2, 4), a third tuple is (5, 6) and a fourth tuple is (5, 7), one of ε-removal pattern arrangements that minimize $f_{num}$ will be x=0111. This means $x_1=0$, $x_2=1$, $x_3=1$ and $x_4=1$. ε-transitions are actually removed on line 5 on the basis of the ε-removal pattern arrangement, and necessary transitions are generated.

In ε-removal, lines 3 to 12 in FIG. 13 may be executed on each state. $Q_ε$={1, 2, 3, 4, 5, 6, 7}. Finally, on line 13, the result of ε-removal is reflected on Q and E.

A case where q=1 will be described. In this case, the result of line 3 will be $E_{in}$=φ, $E_{out}$={(1, b, 2)}. $b_{initial}$=true and $b_{final}$=false. Since the second condition on line 4 is satisfied, line 5 is executed but $E_{new}$ is not changed. This is because transitions and states to be added are already included in the original FSA. While the condition on line 8 is satisfied, $I_{new}$ will not be changed even when line 9 is executed since the state 1 is originally included in $I_{new}$. On line 12, an ε-transition (1, ε, 3) is removed from $E_{new}$.

A case where q=2 will be described. In this case, the result of line 3 will be $E_{in}$={(1, b, 2)}, $E_{out}$={(2, a, 5)}, $b_{initial}$=false and $b_{final}$=false. Since the first condition on line 4 is satisfied, a transition (2, a, 5) is added to $E_{new}$ as a result of line 5. (1, b, 2) is included in the original FSA. On line 12, an ε-transition (2, c, 4) is removed from $E_{new}$.

A case where q=3 will be described. In this case, the result of line 3 will be $E_{in}$={(5, c, 3)}, $E_{out}$={(3, a, 5)}, $b_{initial}$=true and $b_{final}$=false. Since the first and second conditions on line 4 are satisfied, (5, c, 3) and (3, a, 5) are added to $E_{new}$ on line 5 but $E_{new}$ is not changed because these are originally present. Since the condition on line 8 is also satisfied, a state 3 is added to the initial state as a result of executing line 9.

A case where q=4 will be described. In this case, the result of line 3 will be $E_{in}$=φ, $E_{out}$={(4, a, 5)}, $b_{initial}$=false and $b_{final}$=false. Since the conditions on line 4 are not satisfied, a transition (4, a, 5) is removed from $E_{new}$ and a state 4 is removed from $Q_{new}$ as a result of executing line 7.

A case where q=5 will be described. In this case, the result of line 3 will be $E_{in}$={(3, a, 5), (4, a, 5)}, $E_{out}$={(5, c, 3), (5, a, 7), (5, b, 6)}, $b_{initial}$=false and $b_{final}$=true. Since the condition on line 4 is satisfied, $E_{in}$ and $E_{out}$ are added to $E_{new}$. Although there are transitions that are already present, transitions newly added to $E_{new}$ are (5, a, 7) and (5, b, 6). Since the condition on line 10 is also satisfied, a state 5 is added to $F_{new}$, which becomes the final state. On line 12, transitions (5, ε, 6) and (5, ε, 7) are removed from $E_{new}$.

A case where q=6 will be described. In this case, the result of line 3 will be $E_{in}$={(7, b, 6)}, $E_{out}$={(6, a, 7)}, $b_{initial}$=false and $b_{final}$=true. Since the condition on line 4 is satisfied, $E_{in}$ and $E_{out}$ are added to $E_{new}$, but no transitions are newly added because there are already present in $E_{new}$.

A case where q=7 will be described. In this case, the result of line 3 will be $E_{in}$={(6, a, 7)}, $E_{out}$={(7, b, 6)}, $b_{initial}$=false and $b_{final}$=false. Since the condition on line 4 is satisfied, $E_{in}$ and $E_{out}$ are added to $E_{new}$, but no transitions are newly added because there are already present in $E_{new}$.

Finally, on line 13, a transition with the previous state and the next state included in $Q_{new}$ among transitions included in $E_{new}$ is assigned to E, and $Q_{new}$, $I_{new}$ and $F_{new}$ are assigned to Q, I and F, respectively. As a result, the ε-removal according to the first embodiment is completed, and the result as in FIG. 18 can be obtained.

Figure 19:
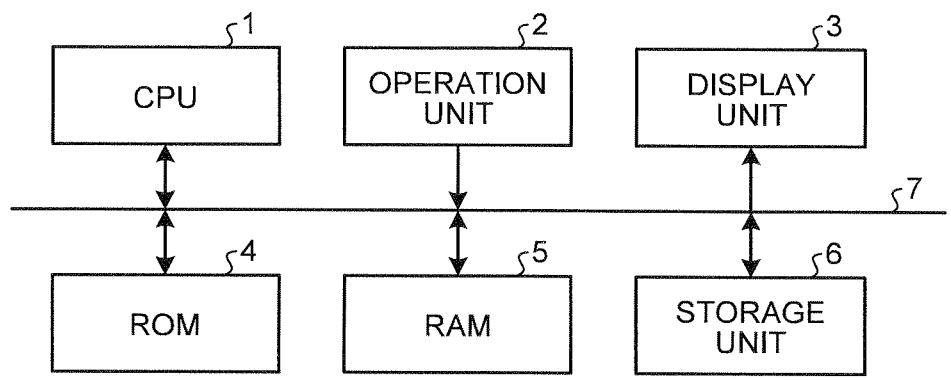
FIG. 19 is a hardware configuration diagram of the information processing device according to the first embodiment.

Next, a hardware configuration of the information processing device 100 according to the first embodiment will be described. FIG. 19 is block diagram illustrating an example of the hardware configuration of the information processing device 100 according to the first embodiment.

As illustrated in FIG. 19, the information processing device 100 includes a central processing unit (CPU) 1, an operation unit 2, a display unit 3, a read only memory (ROM) 4, a random access memory (RAM) 5, a storage unit 6, a bus 7, etc. The units are connected by the bus 7.

The CPU 1 performs various types of processing in cooperation with various control programs stored in advance in the ROM 4 or the storage unit 6 using a predetermined area of the RAM 5 as a work area, and performs overall control of the operations of the respective components (the first set generating unit, the second set generating unit, the combination generating unit, the removing unit, etc.) constituting the information processing device 100. The CPU 1 also implements functions of the respective components in cooperation with predetermined programs stored in advance in the ROM 4 or the storage unit 6.

The operation unit 2 is an input device such as a mouse and a keyboard that receives information input by operation of the user as an instruction signal and outputs the instruction signal to the CPU 1.

The display unit 3 is a display device such as a liquid crystal display (LCD) that displays a variety of information on the basis of a display signal from the CPU 1.

The ROM 4 stores therein programs, various setting information and the like for the control of the information processing device 100 in an unrewritable manner.

The RAM 5 is a volatile storage medium such as SDRAM that functions as a work area of the CPU 1. Specifically, the RAM 5 serves as a buffer or the like that temporarily stores therein various variables, parameters and the like generated in ε-removal processing.

The storage unit 6 includes a semiconductor storage medium such as a flash memory or a magnetically or optically recordable storage medium, and stores therein programs, a variety of setting information and the like for the control of the information processing device 100 in a rewritable manner. The storage unit 6 also stores therein a variety of information on FSAs in advance and records FSAs that are results of ε-removal processes.

Programs to be executed in the information processing device according to the first embodiment are recorded on a computer readable recording medium such as a compact disk read only memory (CD-ROM), a flexible disk (FD), a compact disk recordable (CD-R) and a digital versatile disk (DVD) in a form of a file that can be installed or executed, and provided as a computer program product.

Alternatively, the programs to be executed in the information processing device according to the first embodiment may be stored on a computer system connected to a network such as the Internet, and provided by being downloaded via the network. Still alternatively, the programs to be executed in the information processing device according to the first embodiment may be provided or distributed through a network such as the Internet.

The programs in the first embodiment may be embedded in a ROM or the like in advance and provided therefrom.

The hardware configurations of information processing devices in second and third embodiments described below are similar to that in FIG. 19. In addition, programs to be executed in the information processing devices of the second and third embodiments are provided by configurations and in manners similar to those described above.

As described above, the information processing device according to the first embodiment obtains a range (connected undirected ε-closure) of states that is affected by a result of selection of an ε-removal pattern, and performs ε-removal for each obtained connected undirected ε-closure. A connected undirected ε-closure is searched without depending on the directions of ε-transitions. Accordingly, there is no dependency on the direction of ε-removal, and it is not necessary to select whether ε-removal is to be performed in the direction of original transitions or in the direction reverse to that of original transitions. Furthermore, a finite state automaton composed of the same number or a smaller number of transitions as/than the method of the related art can be obtained.

Second Embodiment

In the second embodiment, a method of removing ε-transitions appearing in a weighted finite state automaton (WFSA) will be described. An ε-transition used herein refers to a transition with the input symbol being ε. A WFSA has a function of determining whether or not to accept a certain symbol sequence when the symbol sequence is input, and outputting a weight thereof if the symbol sequence is accepted. The output weight is obtained by calculating weights on paths corresponding to the input symbol sequence according to a predetermined rule as described below.

An i-th path among the paths corresponding to an input of a symbol sequence x is represented by $\pi_i$. A path $\pi$ includes one or more transitions, which are represented by $e_1, e_2, \ldots, e_n$ in this order from the one that can be reached first from an initial state. The weight on the transition $e_i$ is represented by $w(e_i)$, and the weight on the path $\pi$ is represented by $w(\pi)=w(e_1)(\times)w(e_2)(\times)\ldots(\times)w(e_n)$. The weight corresponding to the symbol sequence x is represented by $w(x)=w(\pi_1)(+)w(\pi_2)(+)\ldots(+)w(\pi_n)$. In other words, the weight corresponding to the symbol sequence x is a result of calculating the weights on all the paths with (+).

Note that operations such as min and max can be used for the operation (+). In addition, operations such as + (addition) and × (multiplication) can be used for the operation (×). $1^\#$ for a given weight c is defined as a value satisfying $c(\times)1^\#=1^\#(\times)c=c$. For example, $1^\#$ is 0 when (×) is +, and $1^\#$ is 1 when (×) is ×. In other words, $1^\#$ is a value (specific value) that does not affect the calculation result even when the value is not present in calculating a weight on a path connecting given states.

Such a technique of generalizing such operation of weights is described in detail in Mehryar Mohri, "Semiring Frameworks and Algorithms for Shortest-distance Problems" (Journal of Automata, Languages and Combinatorics, 2002, vol. 7, pp. 321-350).

If an ε-transition is removed when a value other than $1^\#$ is assigned to the ε-transition, the weight that is obtained when the symbol sequence corresponding to the path including the removed ε-transition changes. It is therefore necessary to transform the WFSA so that the weights on ε-transitions become $1^\#$ in advance in order to remove the ε-transitions by using the method described in the first embodiment.

Figure 20:
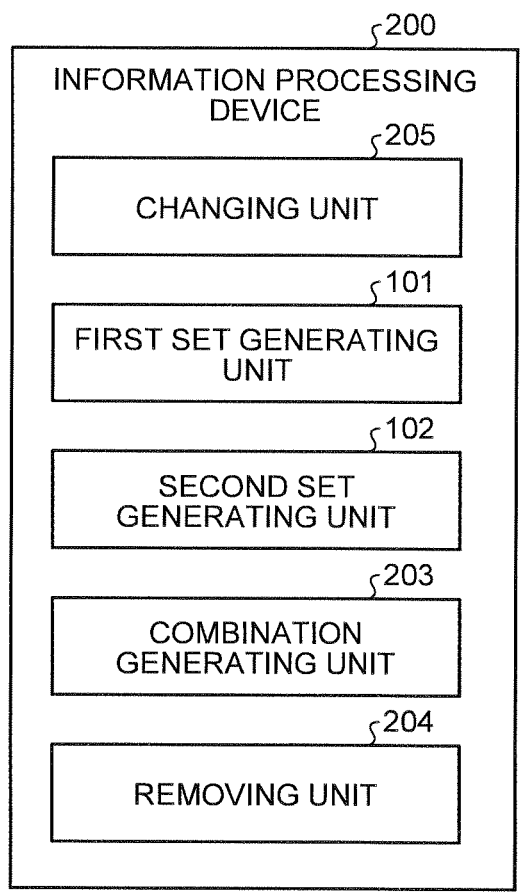
FIG. 20 is a functional block diagram of an information processing device according to a second embodiment.

FIG. 20 is a block diagram illustrating an example of a configuration of an information processing device 200 according to the second embodiment. As illustrated in FIG. 20, the information processing device 200 includes a changing unit 205, a first set generating unit 101, a second set generating unit 102, a combination generating unit 203 and a removing unit 204.

The second embodiment is different from the first embodiment in that the changing unit 205 is added and in the functions of the combination generating unit 203 and the removing unit 204. Since the other configuration and functions are the same as in FIG. 1 that is the block diagram illustrating the configuration of the information processing device 100 according to the first embodiment, the same reference numerals are used therefor and the description thereof will not be repeated here.

The changing unit 205 changes a weight on an transition included in a path connecting given states included in a WFSA to a specific value $1^\#$. The combination generating unit 203 is different from the combination generating unit 103 in the first embodiment in that the combination generating unit 203 evaluates the number of transitions taking the weights into account. The removing unit 204 is different from the removing unit 104 in the first embodiment in that the removing unit 204 performs ε-removal taking the weights into account.

Methods

Next, an ϵ-removal process performed by the information processing device 200 thus configured according to the second embodiment will be described. In the case of a WFSA, ϵ-transitions are removed by a method similar to that in the first embodiment after transforming the WFSA so that the weights on all the ϵ-transitions become $1^{\#}$ for the reason described above.

Moving of Weights

Weights are moved before or after ϵ-transitions so that as less weights as possible remain on the ϵ-transitions (so that as many weights as possible on the ϵ-transitions become $1^{\#}$). FIG. 21 is a drawing illustrating an example of pseudo codes (push-weight) of a method for moving weights. In the drawing, a symbol of a circle containing + therein corresponds to (+) described above, and a symbol of a circle containing × therein corresponds to (×) described above. In a case of a path where a smaller weight is preferable, processing may be performed assuming that (+) is min, (×) is + and $1^{\#}$ is 0. In a case of a path where a larger weight is preferable, processing may be performed assuming that (+) is max, (×) is + and $1^{\#}$ is 0.

On line 1, first states out of 2-tuples consisting of states included in $P_\epsilon$ are collected and assigned to $Q_s$. Similarly, second states are collected and assigned to $Q_d$. In addition, W is initialized to an empty set.

Line 2 expresses that a state included in $Q_s$ is represented by $q_s$ and lines 3 to 15 are processed for all the states included in $Q_s$.

On line 3, second states with first states being $q_s$ out of 2-tuples consisting of states included in $P_\epsilon$ are collected and assigned to $Q_n$. This is equivalent to obtaining a set of states that can be reached by following ϵ-paths in the forward direction from $q_s$.

On line 4, a weight on a best path among ϵ-paths from $q_s$ to respective states included in $Q_n$ is calculated by using a function ϵ-distance, and the calculation result is assigned to W'. Elements of W' constitute a 3-tuple (an initial state of the ϵ-path, a final state of the ϵ-path and the weight on the ϵ-path). Herein, the first state of the 3-tuple is $q_s$, and the second state is any of the states included in $Q_n$. The third value is the weight on the best path among the ϵ-paths between the first state and the second state.

ϵ-distance can be calculated by the Dijkstra's Algorithm that is well known. Alternatively, ϵ-distance can also be calculated by a common method for solving a single-source shortest-distance problem from one state described in the document by Mohri mentioned above.

If an incoming ϵ-transition to the state $q_s$ is present or if the state $q_s$ is the final state on line 5, W' is added to W on line 6. Otherwise, the process proceeds to line 8.

On line 8, all the weights that are the third values of the 3-tuples obtained on line 4 and all the weights on transitions other than ϵ-transitions among outgoing transitions from the state $q_s$ are calculated with (+), and the calculation result is assigned to w. Herein, weight(e) is a weight assigned to a transition e. When (+) is min, the smallest of the weights can be obtained.

On line 9, a 3-tuple having a value obtained by processing the weight recorded in the third of a 3-tuple included in W' and $w_m^{-1}$ by (×) operation as a new third value is added to W. When (+) is max and (×) is + or when (+) is min and (×) is +, $y^{-1}$ and −y are equal. For example, when $w_m$ is 2 and w is 3, $w_m^{-1}(\times)w=-w_m+w=-2+3=1$ is obtained.

On lines 10 and 11, processing of replacing the weights w of transitions other than ϵ-transitions among outgoing transitions from $q_s$ with the result of operation of $w_m^{-1}$ and w by (×) is performed.

On lines 12 and 13, processing of replacing the weights w of transitions other than ϵ-transitions among incoming transitions to $q_s$ with the result of operation of w and $w_m$ by (×) is performed. For example, when the weight on an incoming transition e to $q_s$ is 10, $w_m$ is 2 and (×) is +, the weight on the transition e after this processing is completed will be 12.

On lines 14 and 15, when the state $q_s$ is the initial state, the initial weight $\lambda(q_s)$ of the state $q_s$ is replaced with $\lambda(q)(\times)w_m$.

As a result of the processing of lines 2 to 15, the weights assigned to ϵ-transitions will be pushed to the direction reverse to the direction of the transitions.

Line 16 expresses that a state included in $Q_d$ is represented by $q_d$, and processing from line 17 to line 25 is executed for the respective states included in $Q_d$.

On line 17, all the weights recorded as the third values of 3-tuples with the states recorded as the second values being $q_d$ among 3-tuples included in W and all the weights assigned to transitions other than ϵ-transitions among incoming transitions to the state $q_s$ are calculated with (+), and the calculation result is assigned to $w_m$.

On lines 18 and 19, the weights w recorded as the third values of 3-tuples with the states recorded as the second values being $q_d$ among the 3-tuples included in W are replaced by values obtained by $w(\times)w_m^{-1}$.

On lines 20 and 21, the weights w of incoming transitions to $q_d$ other than ϵ-transitions are replaced with values obtained by $w(\times)w_m^{-1}$.

On lines 22 and 23, the weights w of outgoing transitions from $q_d$ other than ϵ-transitions are replaced with values obtained by $w_m(\times)w$.

On lines 24 and 25, when the state $q_d$ is the final state, final weights $\rho(q_d)$ of the state $q_d$ are replaced with $w_m(\times)\rho(q_d)$.

As a result of the processing of lines 16 to 25, the weights assigned to ϵ-transitions will be pushed to the direction of the transitions.

On line 26, 3-tuples with the weights recorded as the third values are $1^{\#}$ among the 3-tuples included in W are removed from W.

On line 27, W obtained as a result of the processing of lines 1 to 26 is returned as the result of this process.

All the weights on ϵ-paths do not always become $1^{\#}$ only by the push-weight illustrated in FIG. 21. Accordingly, in order to change all the weights on the ϵ-paths to $1^{\#}$, states and transitions are newly added for each ϵ-path where a weight remains. There are two methods for the addition. One method is copying a previous state of an ϵ-path and an incoming transition thereto, and assigning the weight on the ϵ-transition thereto. Another method is copying a next state resulting from an ϵ-path and an outgoing transition therefrom, and assigning the weight on the ϵ-transition thereto. The former method is referred to as a push pattern 0 and the latter method is referred to as a push pattern 1. These two patterns are collectively referred to as push patterns.

Figure 22:
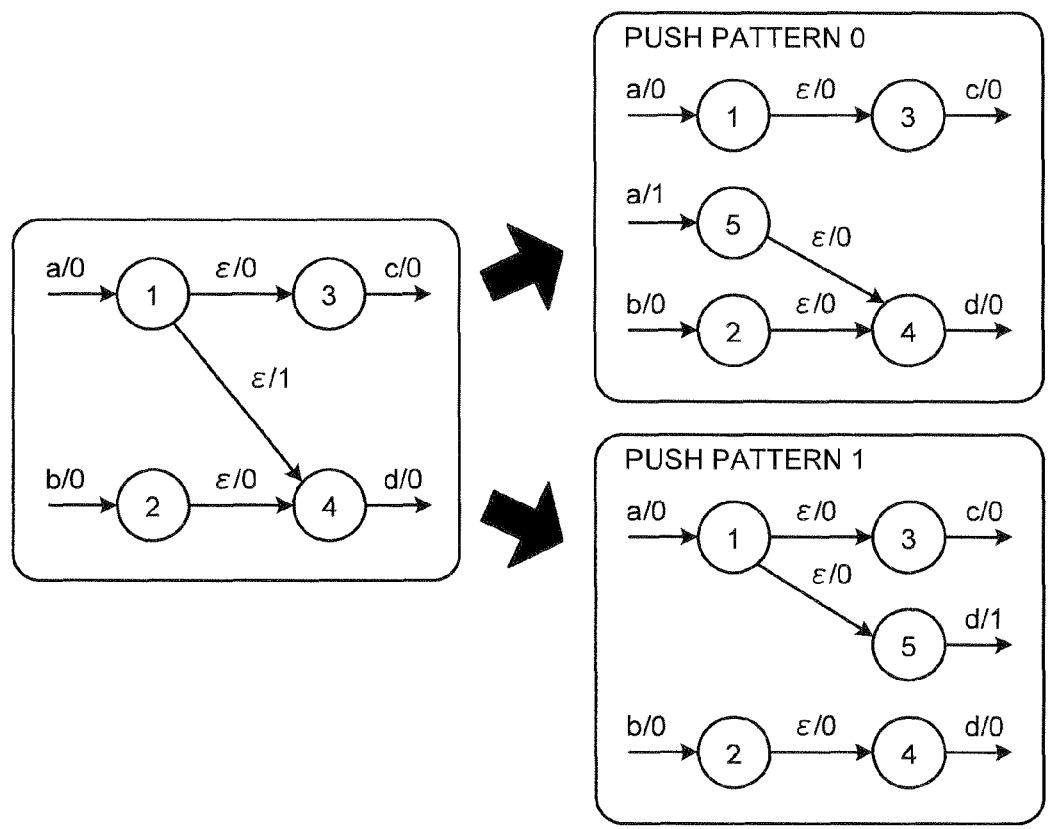
FIG. 22 is a diagram illustrating an example of push patterns.

FIG. 22 is a diagram illustrating an example of the push patterns. In FIG. 22, a symbol on the left of a slash of each of written marks near respective transitions represents an input symbol assigned to the transition and a numeral on the right of the slash represents the weight.

Figure 23:
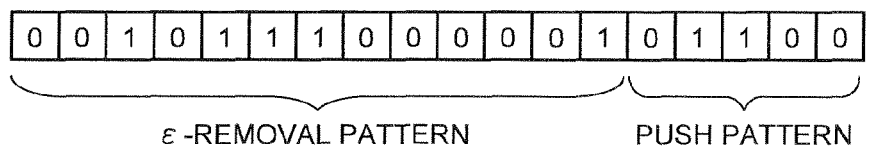
FIG. 23 is a diagram illustrating an example of an ϵ-removal pattern arrangement x.

FIG. 23 is a diagram illustrating an example of an ϵ-removal pattern arrangement x. A sequence of 0 and 1 indicating which push pattern is to be used is added to the ϵ-removal pattern arrangement x in the first embodiment. Then, the ϵ-removal pattern arrangement x is divided into a part describing the ϵ-removal pattern for ϵ-removal and a part describing the push pattern for processing the weight as in FIG. 23.

Thus, the function $f_{num}(x, P_\epsilon)$ that the combination generating unit 203 uses for the evaluation of the number of transitions is different from that in the first embodiment. Search of combinations, however, can be performed similarly to the first embodiment. In the following, a function that the combination generating unit 203 uses instead of the function $f_{num}$ will be expressed as a function $g_{num}(x, P_\epsilon, W)$. W is a set that the push-weight illustrated in FIG. 21 returns as a processing result. FIG. 24 is a drawing illustrating an example of pseudo codes of the function $g_{num}$. FIG. 25 is a drawing illustrating an example of pseudo codes of a function make-path used in the function $g_{num}$.

On line 1 in FIG. 24, new states and transitions are generated on the basis of x and $P_\epsilon$. The generated states and transitions are assigned to $Q_{new}$ and $E_{new}$, respectively. Among the states, initial states are assigned to $I_{new}$ and final states are assigned to $F_{new}$. Since the new states and transitions are generated, ϵ-tuples are changed. The changed ϵ-tuples are assigned to $P_\epsilon'$.

Processing from line 2 to line 5 is that of obtaining the number of transitions after ϵ-removal from the WFSA to which the states and transitions generated on line 1 are added. More specifically, the processing is as follows.

On line 2, the states, the transitions, the initial states and the final states included in the WFSA to be processed are recorded in $Q_{old}$, $E_{old}$, $I_{old}$ and $F_{old}$, respectively.

On line 3, $Q_{new}$, $E_{new}$, $I_{new}$ and $F_{new}$ are added to a set Q of the states, a set E of the transitions, a set I of the initial states and a set F of the final states, respectively, of the WFSA to be processed.

On line 4, the number of transitions after ϵ-removal by the function $f_{num}$ used in the first embodiment is obtained and assigned to N.

On line 5, $Q_{old}$, $E_{old}$, $I_{old}$ and $F_{old}$ saved on line 2 are used to return to the original WFSA.

On line 6, the number N of transitions obtained as a result of the processing from line 1 to line 5 is returned as the processing result.

Next, the function make-path in FIG. 25 will be described. On line 1 in FIG. 25, $Q_{new}$ and $E_{new}$ are initialized to empty sets.

Line 2 expresses that processing from line 3 to line 15 is repeated from i=1 to $|x|-|P_\epsilon|$.

On line 3, the first value of a 3-tuple recorded in $w_i$ that is the i-th element of W is assigned to $q_s$, the second value thereof is assigned to $q_d$ and the third value thereof is assigned to w.

On line 4, a new state that is not included in Q is created and assigned to $q_{new}$.

On line 5, the new state $g_{new}$ created on line 4 is added to $Q_{new}$.

On line 6, it is determined whether or not the $i+|P_\epsilon|$-th value of x is 0. If the value is 0, the process proceeds to line 7. If the value is other than 0, the process proceeds to line 12.

On lines 7 to 10, generation of transitions, changing of ϵ-tuples, etc. are performed on the basis of the push pattern 0.

On line 7, transitions other than ϵ-transitions among incoming transitions to the state $q_s$ are copied as incoming transitions to the new state $q_{new}$. The weights $w_e$ are replaced with $w_e(\times)w$ at this point.

On line 8, ϵ-tuples $(q_s, q_d)$ that have become unnecessary are removed from $P_\epsilon$ and ϵ-tuples $(q_{new}, q_d)$ are newly added.

On line 9, it is determined whether $q_s$ is the initial state. If $q_3$ is the initial state, $q_{new}$ is added to $I_{new}$ and the initial weight on $q_{new}$ is set to a result of calculating the initial weight on $q_s$ and w with (×) on line 10.

On lines 12 to 15, generation of transitions, changing of ϵ-tuples, etc. are performed on the basis of the push pattern 1.

On line 12, transitions other than ϵ-transitions among outgoing transitions from the state $q_d$ are copied as outgoing transitions from the state $q_{new}$. The weights $w_e$ are replaced with $w(\times)w_e$ at this point.

On line 13, ϵ-tuples $(q_s, q_d)$ that have become unnecessary are removed from $P_\epsilon$ and ϵ-tuples $(q_s, q_{new})$ are newly added.

On line 14, it is determined whether or not $q_d$ is the final state. If $q_d$ is the final state, $q_{new}$ is added to $F_{new}$ and the final weight on $q_{new}$ is set to a result of calculating w and the final weight on $q_d$ with (×) on line 15.

On line 16, a 5-tuple $(Q_{new}, E_{new}, I_{new}, F_{new}, P_\epsilon)$ are returned as a result of processing of lines 1 to 15.

Method for removing all ϵ-transitions included in WFSA

All of ϵ-transitions included in a WFSA can be removed by combining the methods described above. FIG. 26 is a drawing illustrating an example of pseudo codes (WFSA-DI-ϵ-removal) of a method for removing all ϵ-transitions included in a WFSA.

On line 1, undirected ϵ-closures are calculated by all-undirected-ϵ-closure( ) (FIG. 3), and the calculation result is assigned to Θ similarly to the first embodiment.

On line 2, connected undirected ϵ-closures are calculated by all-CUEC(Θ) (FIG. 5), and the calculation result is assigned to Ψ.

Line 3 expresses that lines 4 to 9 are processed on each of the connected undirected ϵ-closures ψ included in Ψ.

On line 4, ϵ-tuples are obtained and assigned to $P_\epsilon$ similarly to the first embodiment.

On line 5, the method of FIG. 21 is used using an ϵ-tuple $P_\epsilon$ as the first argument to move as many weights on ϵ-transitions as possible to transitions that are before or after the ϵ-transitions that are not ϵ-transitions. Furthermore, the weight on the best path among the ϵ-paths connecting the states of ϵ-tuples after moving the weights is obtained as a 3-tuple together with the initial state and the final state of the path. As a set composed of the 3-tuple is assigned to W.

On line 6, the patterns in an ϵ-removal pattern arrangement x' having a length of $|P_\epsilon|+|W|$ is variously changed to find x' with which the function $g_{num}$ is the smallest, and such x' is assigned to x. Similarly to the first embodiment, all of the combinations of x may be searched or only some of the combinations may be searched. Similarly to the first embodiment, a common combination optimization method may be used for determining where to search. For example, a genetic algorithm can be applied. Only two patterns with all 0 and with all 1 may be checked.

On line 7, a set of new states and a set of new transitions obtained by the function make-path in FIG. 25 on the basis of x obtained on line 6, a set of initial states and a set of final states are assigned to $Q_{new}$, $E_{new}$, $I_{new}$ and $F_{new}$, respectively. In addition, $P_\epsilon$ is changed as a result.

On line 8, $Q_{new}$, $E_{new}$, $I_{new}$ and $F_{new}$ obtained on line 7 are added to Q, E, I and F, respectively.

On line 9, ϵ-transitions of the WFSA to which states and transitions are added on line 8 are removed on the basis of x and $P_\epsilon$, and necessary transformation is performed as a result. This is the same as in the first embodiment. However, the processing of initial weights and final weights are added (details thereof will be described later). As a result of the process described above, ϵ-transitions of a WFSA can be removed.

Next, details of a function WFSA-CUEC-ϵ-removal used on line 9 in FIG. 26 will be described with reference to FIG. 27. FIG. 27 is a drawing illustrating an example of pseudo codes (WFSA-CUEC-ϵ-removal) of ϵ-removal.

Items of the initial weights and the final weights are added to the returned values obtained on line 3, and setting of the initial weights using the values is added on line 9 and setting of the final weights using the values is added on line 11. Furthermore, processing on the initial weights and the final weights is also added to line 1 and line 13. On line 1, processing of assigning initial weights λ(q) associated with initial states qϵI to $\lambda_{new}(q)$ and assigning final weights ρ(q) associated with final states qϵF to $\rho_{new}(q)$ is added. On line 13, processing of assigning initial weights $\lambda_{new}(q)$ associated with initial states $qϵI_{new}$ to λ(q) and assigning final weights $\rho_{new}(q)$ associated with final states $qϵF_{new}$ to ρ(q) is added. Since the other features are the same as CUEC-ϵ-removal in FIG. 13 that are pseudo codes of ϵ-removal in the first embodiment, the description thereof will not be repeated.

FIG. 28 is a drawing illustrating an example of pseudo codes of a function WFSA-make-transition used on line 3 of FIG. 27. In FIG. 28, the processing as follows is added to the function make-transition in FIG. 12.

On line 1, processing of initial weights and final weights are added. The initial weights on the states q are assigned to $\lambda_q$ and the final weights on the states q are assigned to $\rho_q$. In a case where the state q is not the initial state, ∞ is assigned to $\lambda_g$ when min is used for (+) and + is used for (×), and −∞ is assigned to $\lambda_q$ when max is used for (+) and + is used for (×). A case where the state q is not the final state is similarly handled.

Processing of calculating the best final weight is added on line 9, and processing of calculating the best initial weight is added on line 16. Moreover, $\lambda_q$ and $\rho_q$ are added to the returned values on lines 13 and 17.

Example of Processes

Next, an example of processes according to a method of the related art and according to the second embodiment will be described. FIG. 29 is a diagram illustrating a WFSA before ϵ-removal used in this example. A thick-line circle represents an initial state, a left side of the slash represents a state number and a right side thereof represents an initial weight. Here, states 1 and 2 are initial states and the initial weights thereof are 2 and 5, respectively. A double-line circle represents a final state, a left side of the slash represents a state number and a right side thereof represents a final weight. Here, states 6 and 7 are final states and the final weights thereof are 1 and 3, respectively. A symbol on the left of the slash in the characters written near each transition represents an input symbol, and a numeral on the right of the slash represents the assigned weight. The total number of transitions before removing ϵ-transitions is nine.

In this example, processing of weights is performed using min as (+) and + as (×) both in the method according to the second embodiment and in the method of the related art.

Figure 30:
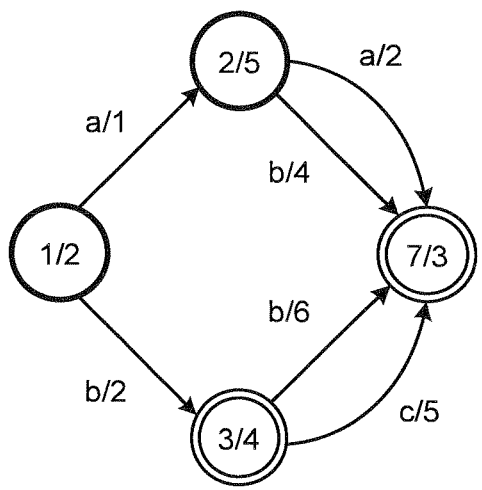
FIG. 30 is a diagram illustrating a result of performing ϵ-removal by a method of the related art.

FIG. 30 is a diagram illustrating a result of performing ϵ-removal by the method of the related art. As illustrated in FIG. 30, the total number of transitions after performing ϵ-removal by the method of the related art is six.

Figure 31:
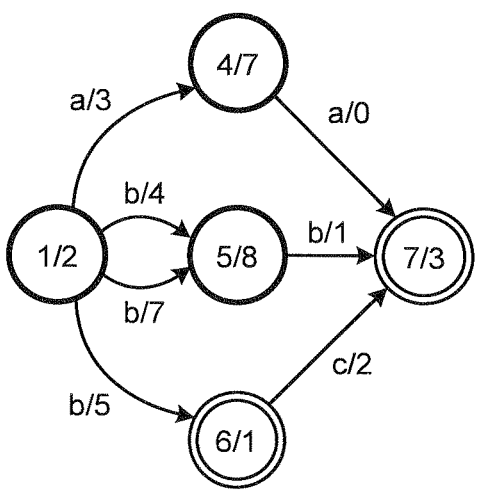
FIG. 31 is a diagram illustrating a result of performing ϵ-removal by the method of the related art after reversing the directions of transitions.

FIG. 31 is a diagram illustrating a result of performing ϵ-removal by the method of the related art after reversing the directions of transitions. Specifically, FIG. 31 illustrates a WFSA in a case in which ϵ-removal according to the method of the related art is performed after the directions of transitions are reversed and after initial states and final states are replaced with each other, the directions of transitions are returned to the original directions, and the initial states and the final states are returned to the original states. As illustrated in FIG. 31, the total number of transitions after ϵ-removal in this case is seven.

A case where ϵ-removal is performed according to the second embodiment will be described below. On line 2 of FIG. 26, connected undirected ϵ-closures can be obtained. Specifically, Ψ={{{2, 3, 4, 5, 6}}} is obtained. Since there is only one connected undirected ϵ-closure in this example, line 3 to 8 are processed thereon.

Figure 32:
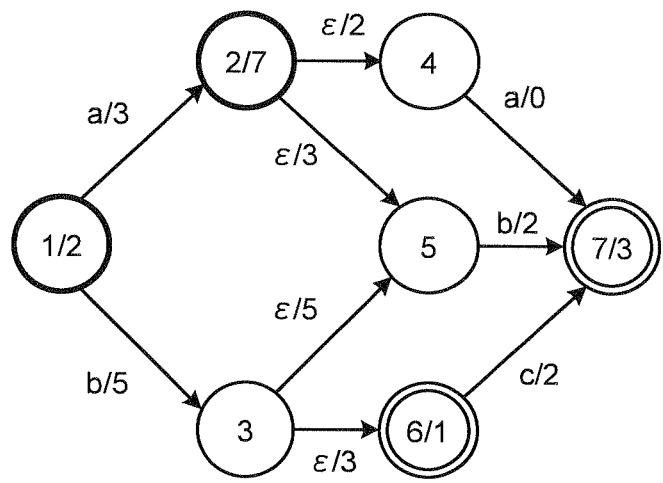
FIG. 32 is a diagram illustrating a WFSA after moving weights.

On line 4, ϵ-tuples can be obtained. Specifically, $P_ϵ$={(2, 4), (2, 5), (3, 5), (3, 6)} is obtained. On line 5, as many weights as possible on ϵ-transitions are moved back or forth to eliminate weights on the ϵ-transitions. However, the weights assigned to the original ϵ-transitions need not be changed. Information resulting from the change is recorded in W that can be obtained by assigning a return value. Specifically, W={(3, 5, 1)} is obtained. This means that one weight remains on an ϵ-path between a state 3 and a state 5 but no weights remain on the other paths. FIG. 32 is a diagram illustrating a WFSA after moving the weights in this manner.

Figure 33:
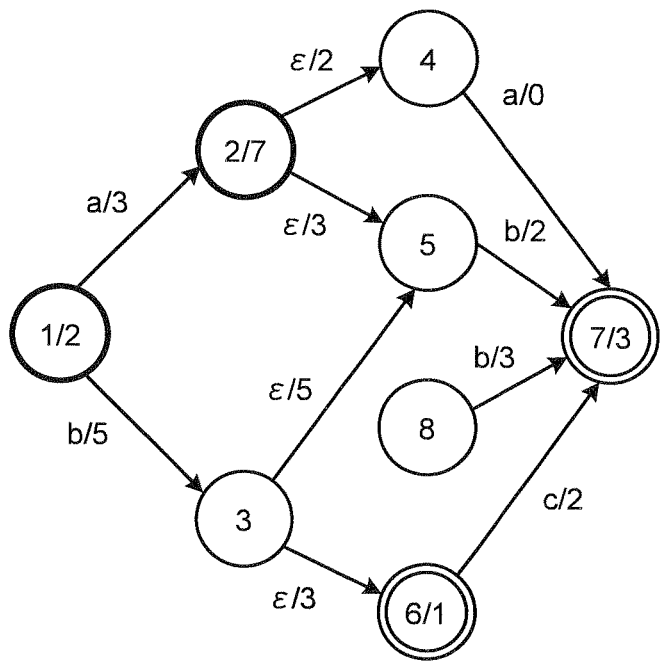
FIG. 33 is a diagram illustrating a WFSA.

On line 6, x with which the number of transitions is the smallest can be obtained. It is assumed that a first tuple is (2, 4), a second tuple is (2, 5), a third tuple is (3, 5), a fourth tuple is (3, 6), and elements of W associated with a push pattern recorded in the fifth value is (3, 5, 1). In this case, one of ϵ-removal arrangement that minimizes the function $g_{num}$ will be x=11111. This means $x_1$=1, $x_2$=1, $x_3$=1, $x_4$=1 and $x_5$=1. On lines 6 and 7, necessary states and transitions are generated, and $P_ϵ$ is updated. FIG. 33 is a diagram illustrating a WFSA obtained after this processing.

Figure 34:
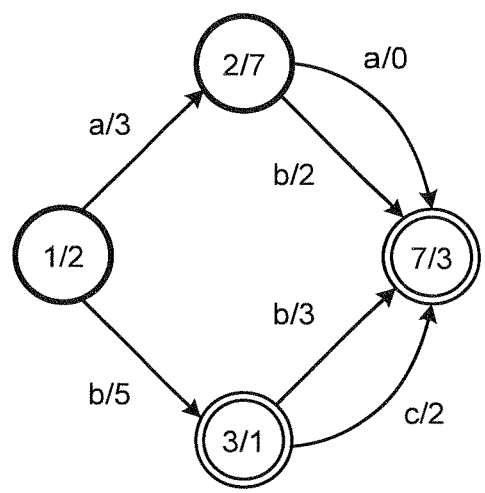
FIG. 34 is a diagram illustrating a final result of ϵ-removal according to the second embodiment.

Although there is no incoming transition to a newly generated state 8, this will not be a problem in the next ϵ-removal process since the transition is included in $P_ϵ$ updated as an ϵ-tuple. Note that the updated $P_ϵ$ is {(2, 4), (2, 5), (3, 8), (3, 6)}. Finally, on line 8, ϵ-transitions are actually removed and necessary transitions are generated. FIG. 34 is a diagram illustrating a final result of ϵ-removal.

As described above, with the information processing device according to the second embodiment, removal of ϵ-transitions can also be performed without depending on the directions of the transitions even on a finite state automaton in which information other than the input symbols is assigned to transitions like a WFSA. Furthermore, a WFSA composed of the same number or a smaller number of transitions as/than the method of the related art can be obtained.

Third Embodiment

In the third embodiment, a method of removing ϵ-transitions in a finite state transducer (FST) will be described. In the case of FST, similarly to the case of the second embodiment, ϵ-removal is performed by the method of the first embodiment after transforming the FST so that ϵ becomes a value with which character strings on all of ϵ-transitions are empty character strings (empty symbols). $1^\#$ used in the second embodiment corresponds to ϵ.

Figure 35:
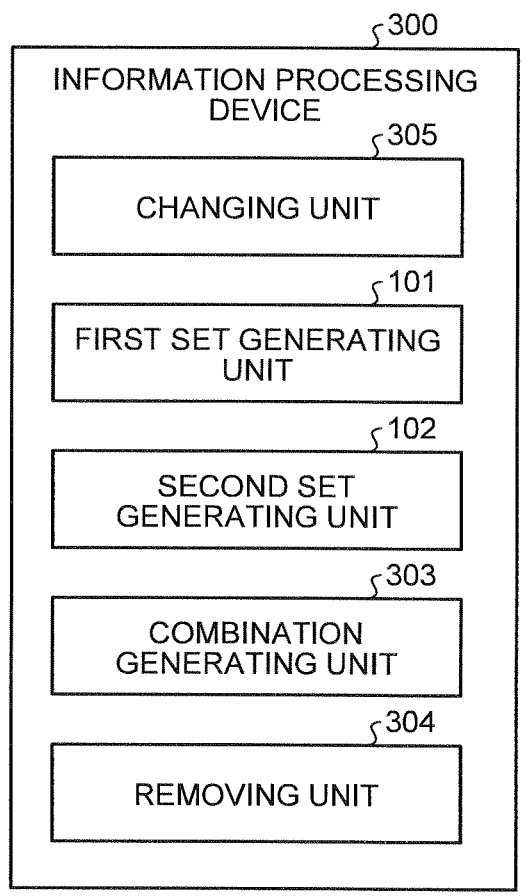
FIG. 35 is a functional block diagram of an information processing device according to a third embodiment.

FIG. 35 is a functional block diagram of an information processing device 300 according to the third embodiment. As illustrated in FIG. 35, the information processing device 300 includes a changing unit 305, a first set generating unit 101, a second set generating unit 102, a combination generating unit 303 and a removing unit 304.

The third embodiment is different from the second embodiment in the functions of the changing unit 305, the combination generating unit 303 and the removing unit 304. Since the other configuration and functions are the same as in FIG. 20 that is the block diagram illustrating the configuration of the information processing device 200 according to the second embodiment, the same reference numerals are used therefor and the description thereof will not be repeated here.

The changing unit 305 changes an output symbol of an ε-transition included in a path connecting given states included in an FST to an empty symbol ε. The combination generating unit 303 is different from the combination generating unit 203 in the second embodiment in that the combination generating unit 303 evaluates the number of transitions using the output symbols instead of weights. The removing unit 304 is different from the removing unit 204 in the second embodiment in that the removing unit 304 performs ε-removal using the output symbols instead of the weights.

Methods

Next, an ε-removal process performed by the information processing device 300 thus configured according to the third embodiment will be described.

Moving of Character Strings

In the third embodiment, first, character strings are moved so that as many character strings as possible on ε-transitions become empty character strings. This is basically the same as the process (push-weight in FIG. 21) of moving the weights described in the second embodiment. However, the part of ε-distance is changed to ε-output described below, (+) is the longest common prefix operation and (×) is operation of concatenating output symbol sequences. In this case, ab(+)ac=a, a(×)b=ab, a(×)ε=ε(×)a=a are obtained, for example.

FIG. 36 is a drawing illustrating an example of pseudo codes (push-output) of a method for moving character strings.

On line 1, first states out of 2-tuples consisting of states included in $P_ε$ are collected and assigned to $Q_s$. Similarly, second states are collected and assigned to $Q_d$. In addition, O is initialized to an empty set.

Line 2 expresses that a state included in $Q_s$ is represented by $q_s$, and lines 3 to 15 are processed for all the states included in $Q_s$.

Line 3 is the same as in FIG. 21.

On line 4, output symbols on ε-paths from $q_s$ to respective states included in $Q_n$ are calculated by using the function ε-output, and the calculation result is assigned to O'. Elements of O' constitute a 3-tuple (an initial state of the ε-path, a final state of the ε-path and an output symbol on the ε-path). Herein, the first state of the 3-tuple is $q_s$, and the second state is any of the states included in $Q_n$. The third value is the output symbol on the ε-path between the first state and the second state. ε-output will be described later.

On lines 5 and 6, if an incoming ε-transition to the state $q_s$ is present or if $q_s$ is the finial state, O' is added to O. Otherwise, the process proceeds to line 8.

On line 8, the longest common prefix operation is performed using all the output symbols that are third values in the 3-tuples obtained on line 4 and all the output symbols of transitions that are not ε-transitions among outgoing transitions from the state $q_s$, and the result thereof is assigned to $o_m$. Herein, output(e) is an output symbol assigned to a transition e.

On line 9, a 3-tuple having a value obtained by processing the output symbol recorded in the third of a 3-tuple included in O' and $o_m^{-1}$ by (×) operation as a new third value is added to O. $o_m^{-1}$(×)o represents processing of removing $o_m$ from ahead of an output symbol o. For example, when $o_m$=ab and o is abc, the result of this processing will be c.

On lines 10 and 11, processing of replacement with output symbols obtained by removing $o_m$ from ahead of output symbols o of transitions other than ε-transitions among outgoing transitions from $q_s$ is performed. For example, when an output symbol of an outgoing transition e from $q_s$ is bc and $w_m$ is b, the output symbol of the transition e will be c after completing this processing.

On lines 12 and 13, processing of replacing of output symbols o of transitions other than ε-transitions among incoming transitions to $q_s$ with output symbols obtained by concatenating o and $o_m$ is performed. For example, when an output symbol of an incoming transition e to $q_s$ is a and $w_m$ is b, the output symbol of the transition e will be ab after completing this processing.

On lines 14 and 15, when the state $q_s$ is the initial state, the initial output symbol $λ_o(q_s)$ of the state $q_s$ is replaced with an output symbol obtained by $λ_o(q_s)$ (×)$o_m$.

Line 16 expresses that a state included in $Q_d$ is represented by $q_d$, and processing from line 17 to line 26 is executed for a case where there is no outgoing ε-transitions from $q_d$ among the respective states included in $Q_d$ and $q_d$ is not the initial state.

On line 17, all the output symbols recorded in the third values of 3-tuple with the states recorded in the second values being $q_d$ among the 3-tuples included in O and all the output symbols assigned to transitions that are not ε-transitions among incoming transitions to the state $q_d$ are reversed in the direction, and processed by the longest common prefix operation. For example, when there are abc and bbc as output symbols, cb is assigned to $o_m$. Note that rev in the pseudo codes is a function for reversing the direction of an output symbol.

On lines 18 to 20, the output symbol o recorded in the third value of a 3-tuple with the state recorded in the second value being $q_d$ among the 3-tuples included in O is replaced by the next output symbol. The output symbol is obtained by reversing the direction of o, removing $o_m$ from ahead and reversing the direction of the resulting output symbol.

On lines 21 and 22, the direction of output symbols of incoming transitions e to $q_d$ that are not ε-transitions is reversed, $o_m$ is removed from ahead thereof, the direction thereof is further reversed, and the result thereof is used as new output symbols of the transitions e.

On lines 23 and 24, output symbols of outgoing transitions e from $q_d$ that are not ε-transitions are replaced with output symbols in which the output symbols obtained by reversing the direction of $o_m$ are connected to the front of the original output symbols.

On lines 25 and 26, when the state $q_d$ is the final state, the final output symbol $ρ_o(q_d)$ of the state $q_d$ is replaced by an output symbol obtained by concatenating an output symbol that is a reversed version of $o_m$ with $ρ_o(q_d)$.

On line 27, a 3-tuple in which the output symbol recorded in the third value of the 3-tuple included in O is ε, that is, a 3-tuple in which the output symbol is empty is removed from O.

On line 28, O obtained by the processing of lines 1 to 27 is returned as a result of the processing.

Next, details of ε-output will be described. Unlike ε-distance, ε-output calculates all of combinations of output symbol sequences present on a path including only ε-transitions connecting two states. FIG. 37 is a drawing illustrating an example of pseudo codes of the function ε-output.

On line 1, a function ε-DFS, which will be described later, is called and a result thereof is assigned to a set $Q_o$ of states and a set $E_o$ of transitions. A set L of output symbols is also initialized to an empty set.

Line 2 expresses that processing of lines 3 to 7 is executed on the respective states q included in $Q_o$. Note that the order of the processing is a topological order calculated by using only the set $E_o$ of transitions. In this manner, it is ensured in processing a certain state that processing of lines 3 to 7 on states on a path through which the certain state is reached from $q_s$ is completed.

Line 3 expresses that processing of lines 4 to 7 is executed on incoming ϵ-transitions e to q among transitions included in E.

On lines 4 and 5, when the set L(p(e)) of output symbols associated with the previous states of the transitions e is an empty set, output symbols of the transitions e are added to a set L(q) of output symbols associated with the states q.

Line 6 expresses that line 7 is processed on output symbols o included in the set L(p(e)) recorded with the previous states of the transitions e.

On line 7, an output symbol obtained by connecting the output symbol o with an output symbol assigned to a transition E is added to a symbol L(q) assigned to the state q.

On lines 8 to 11, the result obtained up to line 7 is converted to a form to be returned as the processing result. As a result, the 3-tuples ($q_s$, any of the states included in $Q_d$, an output symbol) are recorded, as elements in a set R. In the third value of a 3-tuple, an output symbol on an ϵ-path from $q_s$ to a state recorded in the second value is to be recorded.

On line 12, the set R obtained by the processing up to line 11 is returned as the processing result.

Next, details of ϵ-DFS will be described. With this function, a set of states and a set of transitions on all of ϵ-paths with a state specified by a first argument being the initial state can be obtained. FIG. 38 is a drawing illustrating an example of pseudo codes of the function ϵ-DFS.

On line 1, sets $Q_s$ and $Q_o$ of states are added to q. A empty set is assigned to $E_o$.

Line 2 expresses that processing from line 3 to line 7 is executed on outgoing ϵ-transitions e from the state q.

On line 3, it is determined whether the next state of a transition e is included in $Q_s$. If the next state is not included, the process proceeds to line 4.

On line 4, a transition e is added to $E_o$.

On line 5, it is determined whether the next state of a transition e is included in $Q_o$. If the next state is not included, the process proceeds to line 6.

On line 6, the function ϵ-DFS is called recursively. The arguments are the next state of the transition e, $Q_s$ and $Q_o$. The obtained result is assigned to $Q_r$ and $E_r$.

On line 7, $Q_r$ and $E_r$ obtained on line 6 are added to $Q_o$ and $E_o$, respectively.

On line 8, a 2-tuple composed of $Q_o$ and $E_o$ is returned as a result obtained by the processing up to line 7.

Method for removing all ϵ-transitions included in FST

In order to remove all ϵ-transitions included in an FST, the processing relating to weights in FIG. 26 may be replaced by processing relating to output symbols. The parts to be replaced will be described below. One part is to change push-weight on line 4 to push-output. As a result, the third values of the 3-tuples recorded in W are changed from the weights to the output symbols. In addition, processing on initial weights λ(q) associated with initial states q is changed to that on initial output symbols $λ_o(q)$. Furthermore, processing on final weights ρ(q) associated with final states q is changed to that on final output symbols $ρ_o(q)$. Similarly, processing on weights in FIGS. 25, 27 and 28 may be replaced by processing on output symbols.

Example of Processes

Figure 39:
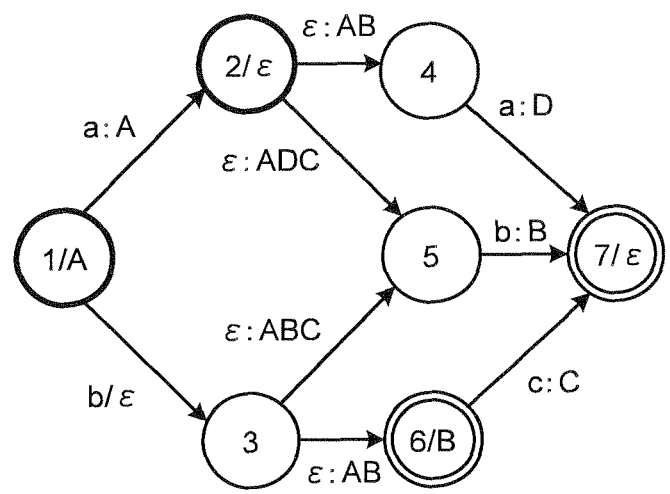
FIG. 39 is a diagram illustrating an FST before ϵ-removal.

Next, an example of processes according to the method of the related art and according to the third embodiment will be described. FIG. 39 is a diagram illustrating an FST before ϵ-removal used in this example. A thick-line circle represents an initial state, a left side of the slash represents a state number and a right side thereof represents an initial output symbol. Here, states 1 and 2 are initial states and the initial output symbols thereof are A and ϵ, respectively. A double-line circle represents a final state, a left side of the slash represents a state number and a right side thereof represents a final output symbol. Here, states 6 and 7 are final states and the final output symbols thereof are B and ϵ, respectively. A symbol on the left of a colon in the characters written near each transition represents an input symbol, and a numeral on the right of the colon represents the assigned output symbol.

Figure 40:
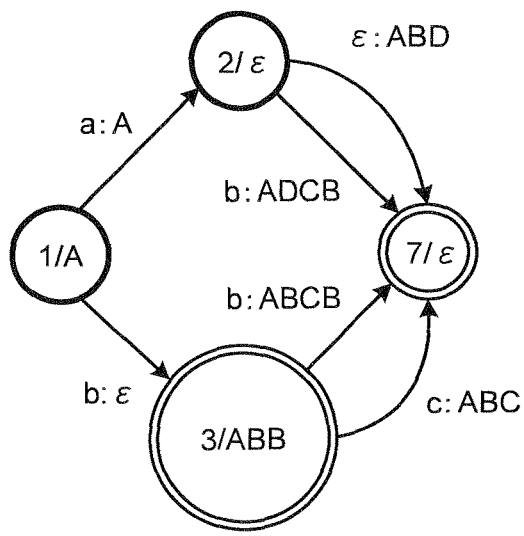
FIG. 40 is a diagram illustrating a result of performing ϵ-removal by a method of the related art.
Figure 41:
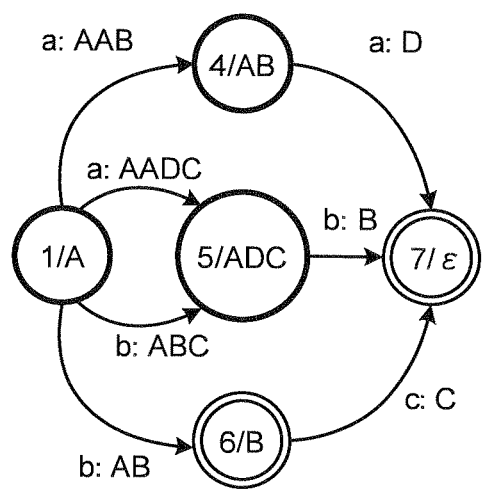
FIG. 41 is a diagram illustrating a result of performing ϵ-removal by the method of the related art after reversing the directions of transitions.

FIG. 40 is a diagram illustrating a result of performing ϵ-removal by a method of the related art. FIG. 41 is a diagram illustrating a result of performing ϵ-removal by the method of the related art after reversing the directions of transitions. Specifically, FIG. 41 illustrates an FST in a case in which ϵ-removal according to the method of the related art is performed after the directions of transitions are reversed and after initial states and final states are replaced with each other, the directions of transitions are returned to the original directions, and the initial states and the final states are replaced with each other again.

Figure 42:
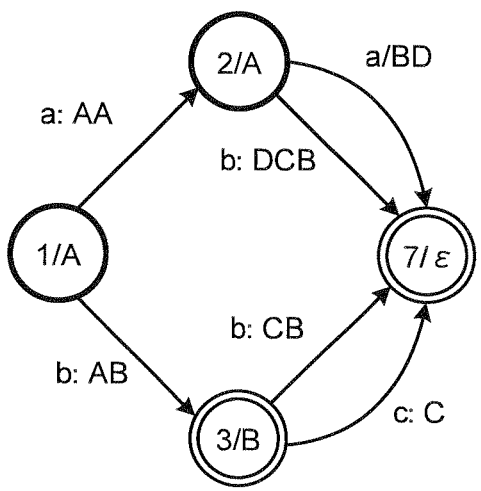
FIG. 42 is a diagram illustrating a result of an ϵ-removal process according to the third embodiment.

FIG. 42 is a diagram illustrating a result of an ϵ-removal process according to the third embodiment. In this example, the number of transitions is equal to that in FIG. 40 illustrating the result obtained by the method of the related art but it can be seen that the manner of assigning output symbols is different.

Case of Weighted Finite State Transducer

In a case of a weighted finite state transducer, the ϵ-removal process described in the second embodiment may be performed after both moving weights and moving output symbols in this order and regarding a combination of a weight and an output symbol as a weight.

As described above, with the information processing device according to the third embodiment, removal of ϵ-transitions can also be performed without depending on the directions of the transitions even when information other than the input symbols is assigned to transitions as in an FST or a WFST. Furthermore, the number of transitions can be made equal to or smaller than that in the method of the related art.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a hardware processor configured to control the information processing device to perform operations comprising:
generating a plurality of first sets, each of the first sets representing a set of states that are reachable by following ϵ-transitions in a forward direction and a reverse direction among states included in a finite state automaton;
generating, when the first sets are connected with one another by one transition that is not an ϵ-transition, a set of states included in each of the first sets connected by one transition that is not an ϵ-transition, and generating one or more second sets, each of the second sets representing the generated set and a first set that is not connected to another first set by one transition that is not an $\epsilon$-transition;

generating, for each of the second sets, a combination of removal patterns to be respectively applied to $\epsilon$-transitions between states included in the second set among a plurality of predetermined removal patterns for removing an $\epsilon$-transition, and obtaining, among the generated combinations, a combination with which the number of transitions in the second set after removing $\epsilon$-transitions is the smallest; and removing, for each of the second sets, $\epsilon$-transitions in the second set by the removal patterns included in the corresponding obtained combination.

2. The information processing device according to claim 1, wherein the hardware processor is further configured to generate, for each of the second sets, some combinations among all combinations of the removal patterns, and to obtain the combination with which the number of transitions in the second set after removing $\epsilon$-transitions is the smallest among the generated combinations.

3. The information processing device according to claim 2, wherein the hardware processor is further configured to generate the some of combinations by using a genetic algorithm.

4. The information processing device according to claim 2, wherein the hardware processor is further configured to generate a combination to apply one of two removal patterns to each of the $\epsilon$-transitions in the second set and a combination to apply another of two removal patterns to each of the $\epsilon$-transitions in the second set, and to obtain the combination with which the number of transitions in the second set after removing the $\epsilon$-transitions is the smallest among the generated combinations.

5. The information processing device according to claim 1, wherein the finite state automaton is a weighted finite state automaton in which weights are added to respective transitions, the hardware processor is further configured to change weights on $\epsilon$-transitions included in a path connecting given states included in the weighted finite state automaton to specific values with which a weight on the path is not changed, the specific values being calculated on the basis of weights on transitions included in the path, and to generate the plurality of the first sets, each of the first sets representing a set of states that are reachable by following $\epsilon$-transitions in a forward direction and a reverse direction among states included in the finite state automaton with the weights on the $\epsilon$-transitions being changed.

6. The information processing device according to claim 5, wherein the hardware processor is further configured to perform a first changing process of changing the weights on the $\epsilon$-transitions included in the path to the specific value without changing transitions between states included in the weighted finite state automaton, or when an $\epsilon$-transition with a weight that is not changed to the specific value by the first changing process is present, to perform a second changing process of adding a new state as a transition source of the $\epsilon$-transition that is not changed to the specific value and replacing the weight on the $\epsilon$-transition that is not changed to the specific value with a weight on incoming transition to the added state or a third changing process of adding a new state as a transition destination of the $\epsilon$-transition that is not changed to the specific value and replacing the weight on the $\epsilon$-transition that is not changed to the specific value with a weight on an outgoing transition from the added state.

7. The information processing device according to claim 1, wherein the finite state automaton is a finite state transducer, the hardware processor is further configured to change output symbols of $\epsilon$-transitions included in a path connecting given states included in the finite state transducer to empty symbols, and to generate the plurality of the first sets, each of the first sets representing a set of states that are reachable by following $\epsilon$-transitions in a forward direction and a reverse direction among states included in the finite state transducer with the output symbols of the $\epsilon$-transitions being changed.

8. The information processing device according to claim 1, wherein the finite state automaton is a weighted finite state transducer in which weights are added to respective transitions, the hardware processor is further configured to change weights on $\epsilon$-transitions included in a path connecting given states included in the weighted finite state transducer to specific values with which a weight on the path is not changed, the specific values being calculated on the basis of weights on transitions included in the path, to change output symbols of $\epsilon$-transitions included in a path connecting given states included in the finite state transducer to empty symbols, and to generate the plurality of the first sets, each of the first sets representing a set of states that are reachable by following $\epsilon$-transitions in a forward direction and a reverse direction among states included in the weighted finite state transducer with the weights on and the output symbols of the $\epsilon$-transitions being changed.

9. An information processing method comprising:

generating, by a first set generating unit implemented by a hardware processor, a plurality of first sets, each of the first sets representing a set of states that are reachable by following $\epsilon$-transitions in a forward direction and a reverse direction among states included in a finite state automaton;

generating, by a second set generating unit implemented by the hardware processor, when the first sets are connected with one another by one transition that is not an $\epsilon$-transition, a set of states included in each of the first sets connected by one transition that is not an $\epsilon$-transition;

generating, by the second set generating unit, one or more seconds sets, each of the second sets representing the generated set and a first set that is not connected to another first set by one transition that is not an $\epsilon$-transition;

generating, by a combination generating unit implemented by the hardware processor, for each of the second sets, a combination of removal patterns to be respectively applied to $\epsilon$-transitions between states included in the second set among a plurality of predetermined removal patterns for removing an $\epsilon$-transition;

obtaining, for each of the second sets, by the combination generating unit, among the generated combinations, a combination with which the number of transitions in the second set after removing $\epsilon$-transitions is the smallest; and removing, for each of the second sets, by a removing unit implemented by the hardware processor, $\epsilon$-transitions in the second set by the removal patterns included in the corresponding obtained combination.

10. A computer program product comprising a non-transitory computer-readable medium including programmed instructions, wherein the instructions, when executed by a computer, cause the computer to perform at least:

generating a plurality of first sets, each of the first sets representing a set of states that are reachable by following $\epsilon$-transitions in a forward direction and a reverse direction among states included in a finite state automaton;

generating, when the first sets are connected with one another by one transition that is not an $\epsilon$-transition, a set of states included in each of the first sets connected by one transition that is not an $\epsilon$-transition;

generating one or more second sets, each of the second sets representing the generated set and a first set that is not connected to another first set by one transition that is not an $\epsilon$-transition;

generating, for each of the second sets, a combination of removal patterns to be respectively applied to $\epsilon$-transitions between states included in the second set among a plurality of predetermined removal patterns for removing an $\epsilon$-transition;

obtaining, for each of the second sets, among the generated combinations, a combination with which the number of transitions in the second set after removing $\epsilon$-transitions is the smallest; and removing, for each of the second sets, $\epsilon$-transitions in the second set by the removal patterns included in the obtained combination.

11. The information processing device according to claim 1, wherein the finite state automaton having the $\epsilon$-transitions removed is used for at least one of natural language processing and speech recognition.

12. The information processing method according to claim 9, wherein the finite state automaton having the $\epsilon$-transitions removed is used for at least one of natural language processing and speech recognition.

13. The computer program product according to claim 10, wherein the finite state automaton having the $\epsilon$-transitions removed is used for at least one of natural language processing and speech recognition.

\* \* \* \* \*